United States Patent
Beckham et al.

(10) Patent No.: US 11,518,847 B2
(45) Date of Patent: Dec. 6, 2022

(54) POLYMERS AND METHODS OF MAKING THE SAME

(71) Applicant: Alliance for Sustainable Energy, LLC, Golden, CO (US)

(72) Inventors: Gregg Tyler Beckham, Golden, CO (US); Nicholas A. Rorrer, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 134 days.

(21) Appl. No.: 17/205,232

(22) Filed: Mar. 18, 2021

(65) Prior Publication Data

US 2021/0221945 A1    Jul. 22, 2021

Related U.S. Application Data

(63) Continuation of application No. 16/197,337, filed on Nov. 20, 2018, now Pat. No. 10,988,572.

(60) Provisional application No. 62/588,574, filed on Nov. 20, 2017.

(51) Int. Cl.
| | |
|---|---|
| *C08G 63/183* | (2006.01) |
| *C08G 63/52* | (2006.01) |
| *C08F 220/06* | (2006.01) |
| *C08F 222/06* | (2006.01) |
| *C08G 63/91* | (2006.01) |
| *C08G 63/60* | (2006.01) |
| *C08K 7/02* | (2006.01) |
| *C08L 67/06* | (2006.01) |

(52) U.S. Cl.
CPC .......... *C08G 63/183* (2013.01); *C08F 220/06* (2013.01); *C08F 222/06* (2013.01); *C08G 63/52* (2013.01); *C08G 63/60* (2013.01); *C08G 63/91* (2013.01); *C08K 7/02* (2013.01); *C08L 67/06* (2013.01)

(58) Field of Classification Search
CPC .................................................. C08G 63/183
See application file for complete search history.

(56) References Cited

U.S. PATENT DOCUMENTS

| | | | |
|---|---|---|---|
| 3,803,102 A | 4/1974 | Whiton | |
| 5,833,961 A * | 11/1998 | Siegfried | A61K 8/35 424/59 |
| 5,932,666 A * | 8/1999 | Fisher | C08G 63/16 528/297 |
| 6,127,493 A * | 10/2000 | Maurer | C08G 63/78 526/71 |
| 6,573,304 B1 * | 6/2003 | Durand | C08G 18/4225 521/48.5 |
| 8,680,167 B2 | 3/2014 | Agarwal et al. | |
| 10,280,255 B2 * | 5/2019 | Beckham | C08J 3/24 |
| 10,988,572 B2 | 4/2021 | Beckham et al. | |
| 2013/0231420 A1 | 9/2013 | Alidedeoglu et al. | |
| 2015/0329672 A1 | 11/2015 | Kanda et al. | |
| 2016/0096924 A1 | 4/2016 | Kim et al. | |
| 2016/0122471 A1 * | 5/2016 | Bae | C08G 63/916 525/173 |
| 2017/0113995 A1 | 4/2017 | Mastrangelo | |
| 2018/0282481 A1 * | 10/2018 | Beckham | C08G 69/28 |

FOREIGN PATENT DOCUMENTS

| | | |
|---|---|---|
| GB | 887394 | 1/1962 |
| JP | 5646274 B | 11/2014 |
| WO | 2006/077233 A1 | 7/2006 |
| WO | 2007/049233 A1 | 5/2007 |
| WO | 2014/198756 A1 | 12/2014 |
| WO | 2016/069411 A1 | 5/2016 |
| WO | 2017/021496 A1 | 2/2017 |

OTHER PUBLICATIONS

Aslan et al., "Unsaturated polyester resins from glycolysed waste polyethyleneterephthalate: Synthesis and comparison of properties and performance with virgin resin", Journal of Materials Science, 1997, vol. 32, No. 9 pp. 2329-2336.
Atta et al., "New epoxy resins based on recycled poly(ethylene terephthalate) as organic coatings", Progress in Organic Coatings, Jan. 2007, vol. 58, No. 1, pp. 13-22.
Bechthold et al., "Succinic Acid: A New Platform Chemical for Biobased Polymers from Renewable Resources", Chemical Engineering & Technology, 2008, vol. 31, No. 5, pp. 647-654.
Beerthuis et al., "Catalytic routes towards acrylic acid, adipic acid and ε-caprolactam starting from biorenewables", Green Chemistry, 2015, vol. 17, pp. 1341-1361.
Bevington et al., "Copolymers of methyl methacrylate with cinnamic acid", Polymer, 1973, vol. 14, No. 9, pp. 409-410.
Brindell et al., "Polymer Applications of Some Terephthalaldehyde Derivatives", Industrial & Engineering Chemistry Product Research and Development, 1976, vol. 15, No. 1, pp. 83-88.
Chen et al., "Stable and Inert Cobalt Catalysts for Highly Selective and Practical Hydrogenation of C=N and C=O Bonds", Journal of the American Chemical Society, 2016, vol. 138, pp. 8781-8788.
Chen et al., "In situ Supramolecular Polymerization Promoted by the Marriage of Dynamic Covalent Bonding and Pillar[5]arene based host-guest Interaction", Chemical Communications, 2017, vol. 53, pp. 1144 1147.

(Continued)

*Primary Examiner* — Michael F Pepitone
(74) *Attorney, Agent, or Firm* — Michael A. McIntyre

(57) ABSTRACT

An aspect of the present disclosure is a composition that includes

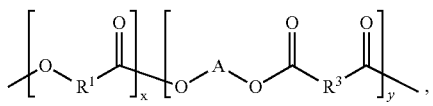

where $R^1$ includes at least one of a saturated hydrocarbon and/or an unsaturated hydrocarbon, $R^3$ includes at least one of a saturated hydrocarbon and/or an unsaturated hydrocarbon, A includes at least one of a saturated hydrocarbon or an unsaturated hydrocarbon, $1 \leq x \leq 1000$, and $1 \leq y \leq 1000$.

16 Claims, 6 Drawing Sheets

(56) References Cited

OTHER PUBLICATIONS

Cousinet et al., "Toward replacement of styrene by bio-based methacrylates in unsaturated polyester resins", European Polymer Journal, Jun. 2015, vol. 67, pp. 539-550.
Dai et al., "2,5-Furandicarboxylic Acid- and Itaconic Acid-Derived Fully Biobased Unsaturated Polyesters and Their Cross-Linked Networks", Industrial & Engineering Chemistry Research, 2017, vol. 56, No. 10, pp. 2650-2657.
Duque-Ingunza et al., "Synthesis of unsaturated polyester resin from glycolysed postconsumer PET wastes", Journal of Material Cycles and Waste Management, 2013, col. 15, No. 3, pp. 256-263.
Fan et al., "Synthesis of Multivalent Organotellurium Chain-Transfer Agents by Post-modification and Their Applications in Living Radical Polymerization", Chemistry—A European Journal, 2016, vol. 22, pp. 17006-17010.
Feuer et al., "Maleic-Fumaric Isomerization in Unsaturated Polyesters", Industrial & Engineering Chemistry, 1954, vol. 46, No. 8, pp. 1643-1645.
He et al., "Injectable biodegradable polymer composites based on poly(propylene fumarate) crosslinked with poly (ethylene glycol)-dimethacrylate", Biomaterials, Dec. 2000, vol. 21, No. 23, pp. 2389-2394.
Lansing et al., "Biobased Methacrylic Acid via Selective Catalytic Decarboxylation of Itaconic Acid", ACS Sustainable Chemistry & Engineering, Feb. 2017, vol. 5, No. 4, pp. 3132-3140.
Li et al., "Catalyst-Free, Atom-Economic, Multicomponent Polymerizations of Aromatic Diynes, Elemental Sulfur, and Aliphatic Diamines toward Luminescent Polythioamides", Macromolecules, 2015, vol. 48, pp. 7747-7754.
Li et al., "Itaconic Acid as a Green Alternative to Acrylic Acid for Producing a Soybean Oil-Based Thermoset: Synthesis and Properties", ACS Sustainable Chemistry & Engineering, Dec. 2017, vol. 5, No. 1, pp. 1228-1236.
Lian et al., "Production of biorenewable styrene: Utilization of biomass-derived sugars and insights into toxicity", Journal of Industrial Microbiology & Biotechnology, May 2016, vol. 43, No. 5, pp. 595-604.
Lu et al., "Production of Diethyl Terephthalate from Biomass-Derived Muconic Acid", Angewandte Chemie—International Edition, 2016, vol. 55, No. 1, pp. 249-253.
Macijauskas et al., "Epoxy Resin and Polyurethane Compositions from Glycolized Poly (ethylene terephthalate) Wastes", Materials Science, 2013, vol. 19, No. 3, pp. 283-290.
Mok et al., "Formation of acrylic acid from lactic acid in supercritical water", The Journal of Organic Chemistry, 1989, vol. 54, No. 19, pp. 4596-4602.
Nabid et al., "Fe3O4—SiO2—P4VP pH-Sensitive Microgel for Immobilization of Nickel Nanoparticles: An Efficient Heterogeneous Catalyst for Nitrile Reduction in Water", ChemCatChem, 2014, vol. 6, pp. 538-546.
Nagahama et al., "Two Dimensional Polymer Synthesis through the Topochemical Polymerization of Alkylenediammonium Muconate as a Multifunctional Monomer", Journal of Polymer Science, Part A: Polymer Chemistry, 2004, vol. 42, pp. 3922-3929.
Parsell et al., "A synergistic biorefinery based on catalytic conversion of lignin prior to cellulose starting from lignocellulosic biomass", Green Chemistry, 2015, vol. 17, pp. 1492-1499.
Pimpan et al., "Synthesis of unsaturated polyester resin from postconsumer PET bottles: Effect of type of glycol on characteristics of unsaturated polyester resin", Journal of Applied Polymer Science, Apr. 2003, vol. 88, No. 3, pp. 788-792.
Rorrer et al., "Renewable Unsaturated Polyesters from Muconic Acid", ACS Sustainable Chemistry & Engineering, 2016, vol. 4, No. 12, pp. 6867-6876.
Shamsi et al., "Novel Polyester Diol Obtained from PET Waste and its Application in the Synthesis of Polyurethane and Carbon Nanotube-Based Composites: Swelling Behavior and Characteristic Properties", Royal Society of Chemistry Advances, 2016, vol. 6, pp. 38399-38415.
Vaidya et al., "Unsaturated polyester resins from poly(ethylene terephthalate) waste. 1. Synthesis and characterization". Industrial & Engineering Chemistry Research, 1987, vol. 26, No. 2, pp. 194-198.
Vaidya et al., "Unsaturated polyester resins from poly(ethylene terephthalate) waste. 2. Mechanical and dynamic mechanical properties", Industrial & Engineering Chemistry Research, 1988, vol. 27, No. 11, pp. 2056-2060.
Vardon et al., "Adipic acid production from lignin", Energy & Environmental Science, 2015, vol. 8, No. 2, pp. 617-628.
Willke et al., "Biotechnological production of itaconic acid", Applied Microbiology and Biotechnology, Aug. 2001, vol. 56, No. 3-4, pp. 289-295.
Xiao et al., "Molecular and structural analysis of epoxide-modified recycled poly(ethylene terephthalate) from rheological data", Polymer Engineering and Science, Oct. 2012, vol. 52, No. 10, pp. 2127-2135.
Zhang et al., "Catalytic dehydration of lactic acid to acrylic acid over sulfate catalysts", The Canadian Journal of Chemical Engineering, Dec. 2008, vol. 86, pp. 1047-1053.

* cited by examiner

POLYMERS AND METHODS OF MAKING THE SAME

CROSS-REFERENCE TO RELATED APPLICATIONS

This application claims the benefit of U.S. Provisional Patent Application No. 62/588,574 filed Nov. 20, 2017, the contents of which are incorporated herein by reference in their entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

Plastics made of organic polymers having very high molecular weights are ubiquitous in all aspects of today's society, finding applications in almost every technology, industry, and market. One characteristic of most plastics is their durability. However, this durability also means that most plastics degrade very slowly, resulting in long lifetimes and the eventual accumulation of plastics in landfills and, unfortunately, also in the environment. Estimates of the total human production of plastics since the 1950s range from one billion tons to over eight billion tons, with only about 9% of that amount recycled. Polyesters are one category of polymers defined by the presence of an ester functional group in the polymer chain, with the most commonly known being polyethylene terephthalate (PET), which is commonly used in fibers for clothing, containers for liquids and foods, as well as in composites for producing resins. Approximately 6 billion pounds of PET are produced annually. Greater than 80% of this annual production ends up in landfills. Thus, methods for reclaiming polyesters such as PET provide great opportunities for both reducing the annual amounts of waste entering landfills, as well as opportunities for the use of recycled polyesters for producing both reclaimed polyesters as well is new and novel polymers and copolymers.

SUMMARY

An aspect of the present disclosure is a composition that includes

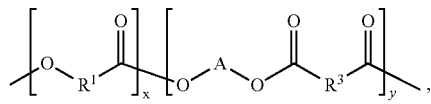

where $R^1$ includes at least one of a saturated hydrocarbon and/or an unsaturated hydrocarbon, $R^3$ includes at least one of a saturated hydrocarbon and/or an unsaturated hydrocarbon, A includes at least one of a saturated hydrocarbon and/or an unsaturated hydrocarbon, $1 \leq x \leq 1000$, and $1 \leq y \leq 1000$.

In some embodiments of the present disclosure, the composition may further include an end-group comprising at least one of hydrogen, a hydroxyl group, a halogen, and/or an ether. In some embodiments of the present disclosure, $R^1$ may further include at least one of oxygen, nitrogen, sulfur, phosphorus, and/or a halogen. In some embodiments of the present disclosure, $R^3$ further may further include at least one of oxygen, nitrogen, sulfur, phosphorus, and/or a halogen. In some embodiments of the present disclosure, A may further include at least one of oxygen, nitrogen, sulfur, phosphorus, and/or a halogen.

In some embodiments of the present disclosure, the composition may have a structure that includes at least one of

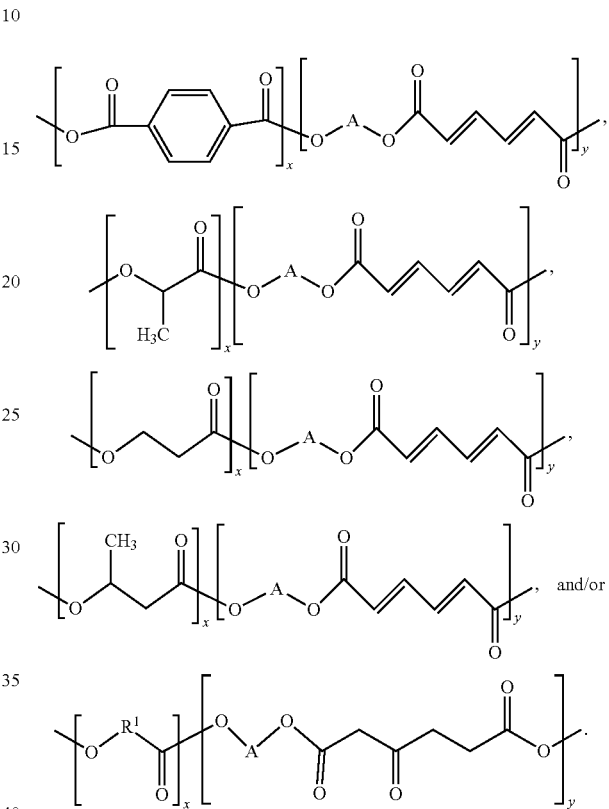

In some embodiments of the present disclosure, the composition may further include $R^5$, where the composition has a structure that includes

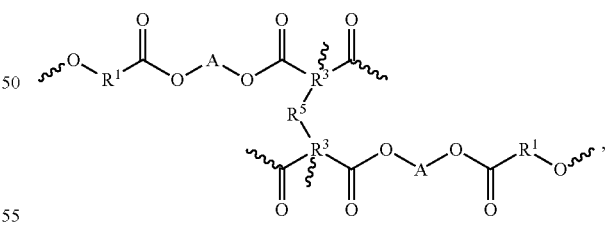

and $R^5$ is derived from a molecule having at least one vinyl group. In some embodiments of the present disclosure, $R^5$ may be derived from at least one of styrene, styrenic divinylbenzene, acrylic acid, and/or methacrylic acid. In some embodiments of the present disclosure, $R^1$ may include between 1 and 10 carbon atoms, inclusively. In some embodiments of the present disclosure, $R^3$ may include between 1 and 10 carbon atoms, inclusively. In some embodiments of the present disclosure, A may include between 1 and 10 carbon atoms, inclusively.

In some embodiments of the present disclosure, the composition may further include $R^2$, where the composition has a structure that includes

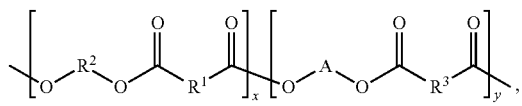

and $R^2$ includes at least one of a saturated hydrocarbon and/or an unsaturated hydrocarbon. In some embodiments of the present disclosure, $R^2$ may further include at least one of oxygen, nitrogen, sulfur, phosphorus, and/or a halogen. In some embodiments of the present disclosure, $R^2$ may include between 1 and 10 carbon atoms, inclusively.

In some embodiments of the present disclosure, the structure may include at least one of

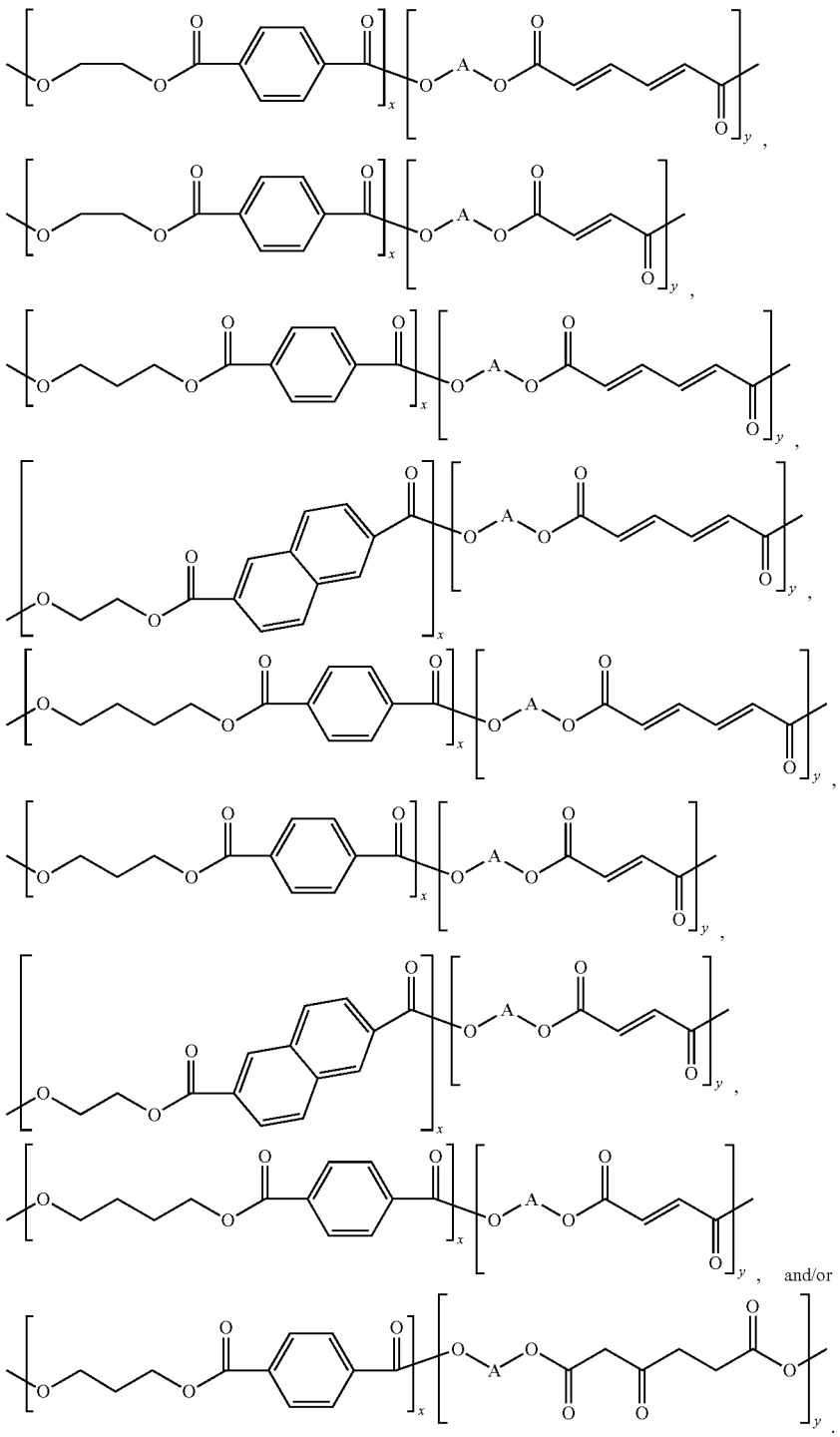

In some embodiments of the present disclosure, the composition may further include $R^2$, where the composition has a structure that includes at least one of

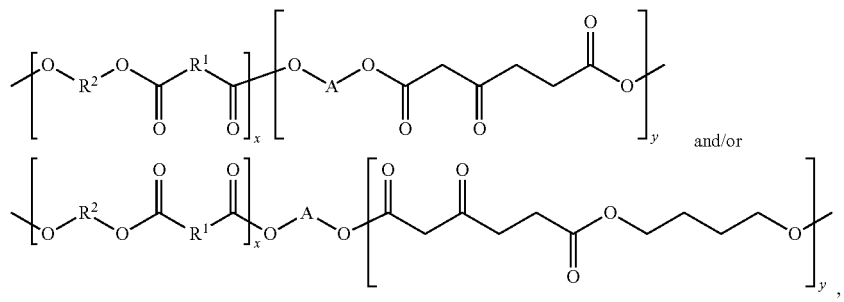

and/or and $R^2$ includes at least one of a saturated hydrocarbon and/or an unsaturated hydrocarbon.

In some embodiments of the present disclosure, the structure may include at least one of

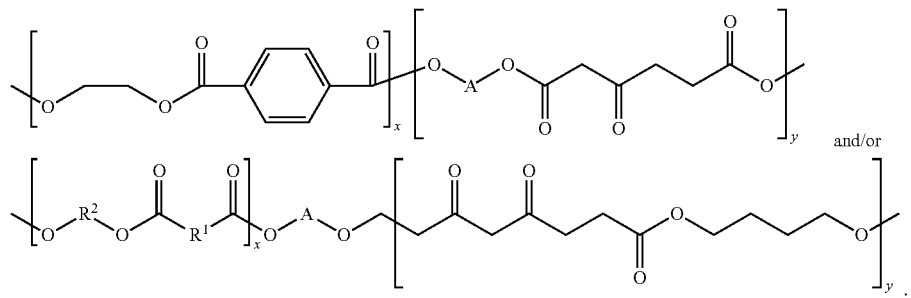

and/or

In some embodiments of the present disclosure, the composition may further include $R^5$, where the composition has a structure that includes

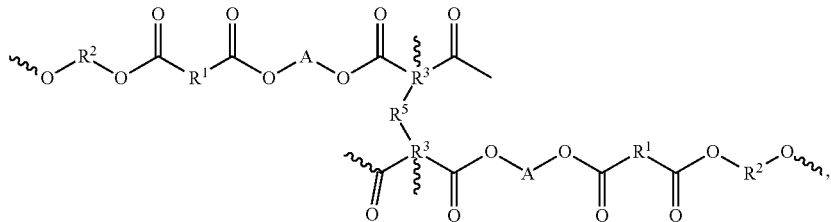

and $R^5$ is derived from a molecule having at least one vinyl group. In some embodiments of the present disclosure, and $R^5$ may be derived from at least one of styrene, styrenic divinylbenzene, acrylic acid, and/or methacrylic acid.

In some embodiments of the present disclosure, the structure may include

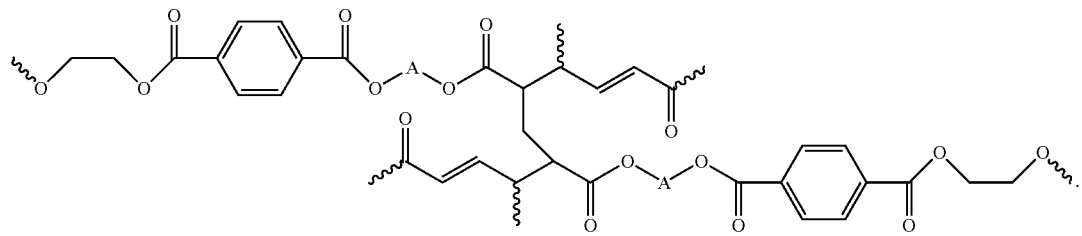

In some embodiments of the present disclosure, the composition may further include a fiber, where the structure and the fiber form a reinforced plastic. In some embodiments of the present disclosure, the fiber may include at least one of fiberglass, carbon fiber, basalt fiber, and/or a bio-derived fiber.

An aspect of the present disclosure is a method for making a polymer, where the method includes reacting maleic anhydride with a molecule having a first structure that includes

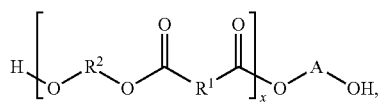

where $R^1$ includes at least one of a saturated hydrocarbon and/or an unsaturated hydrocarbon, $R^2$ includes at least one of a saturated hydrocarbon and/or an unsaturated hydrocarbon, A includes at least one of a saturated hydrocarbon or an unsaturated hydrocarbon, $1 \le x \le 10000$, and the reacting produces a polymer having a second structure that includes

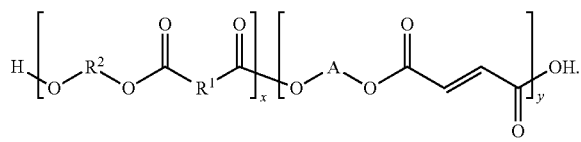

An aspect of the present disclosure is a method for making a polymer, where the method includes reacting

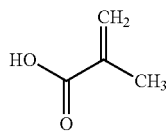

with a molecule having a first structure that includes

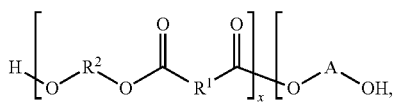

where $R^1$ includes at least one of a saturated hydrocarbon and/or an unsaturated hydrocarbon, $R^2$ includes at least one of a saturated hydrocarbon and/or an unsaturated hydrocarbon, A includes at least one of a saturated hydrocarbon or an unsaturated hydrocarbon, $1 \le x \le 10000$, and the reacting produces a polymer having a second structure that includes

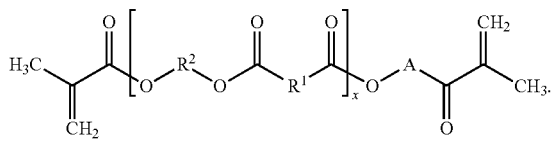

An aspect of the present disclosure is a that includes a first reacting of a molecule having a first structure with a diol that includes A, where the first structure includes

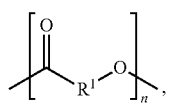

the reacting produces a second structure that includes

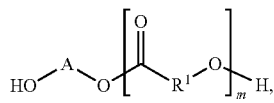

$R^1$ includes at least one of a saturated hydrocarbon and/or an unsaturated hydrocarbon, A includes at least one of a saturated hydrocarbon and/or an unsaturated hydrocarbon, $1 \le n \le 10000$, and m is less than n.

In some embodiments of the present disclosure, the method may further include a second reacting of the second structure with a bio-derived molecule having a third structure, where the third structure includes

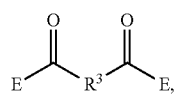

$R^3$ includes at least one of a saturated hydrocarbon and/or an unsaturated hydrocarbon, the second reacting produces a fourth structure that includes

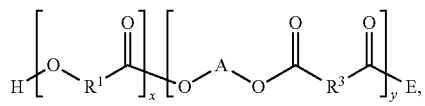

E includes at least one of hydrogen, a hydroxyl group, a halogen, and/or an ether, $1 \le x \le 10000$, and $1 \le y \le 10000$.

REFERENCE NUMBERS

Figure 1:
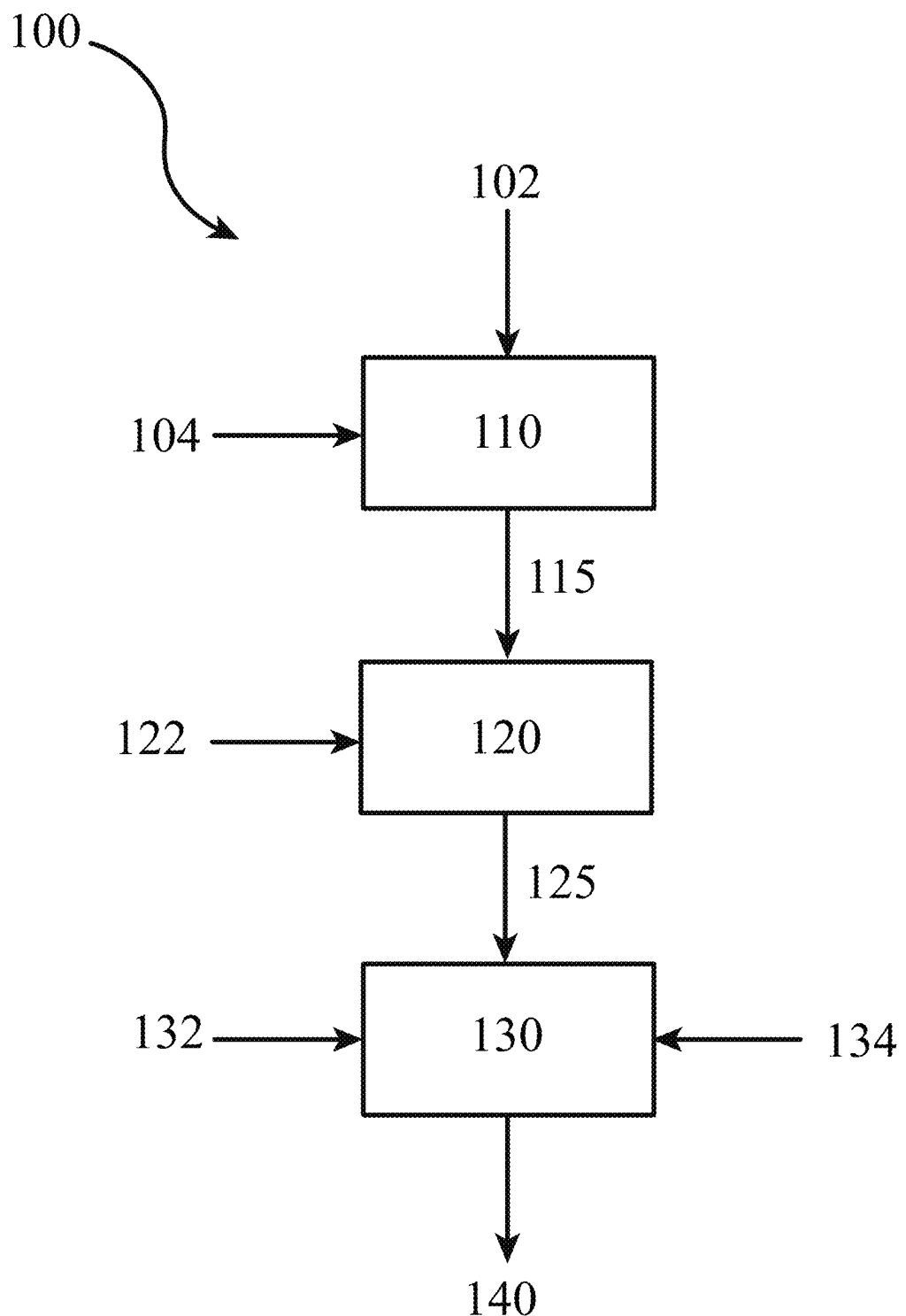
FIG. 1 illustrates a method for making polymers, copolymers, resins, and reinforced plastics, according to some embodiments of the present disclosure.

100 . . . method
102 . . . polyester

104 . . . diol
110 . . . polyester deconstructing
115 . . . deconstructed molecule
120 . . . treating
122 . . . purifying agent
125 . . . purified deconstructed molecule
130 . . . reacting
132 . . . bio-sourced molecule
134 . . . cross-linker/diluent
140 . . . copolymer
150 . . . resin
155 . . . fiber

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure relates to the deconstruction of polyesters, for example reclaimed PET, to produce deconstructed molecules such as at least one of a monomer, oligomer, and/or polymer resulting from the starting PET. As defined herein, a "polyester" is a molecule having at least one ester group within a chain of the molecule. As defined herein, a "macromolecule" is a large molecule having a molecular weight between 1000 and 2000000 Da. Examples of macromolecules include polymers and crosslinked polymers. A polymer may be a "homopolymer", which refers to a polymer chain consisting of only a single type of repeat unit or monomer, for example ethylene. A polymer may also be a "copolymer", which refers herein to a polymer chain consisting of more than one type of repeat unit, for example ABS, which is a copolymer constructed of three repeat units, acrylonitrile, butadiene, and styrene. Crosslinked polymers (homopolymers and/or copolymers) are referred to herein as resins, where neighboring polymer chains are covalently linked together by linking molecules (e.g. styrene). As used herein, the term "oligomer" refers to a relatively short-chained molecule of between 2 to 100 repeat units.

Structure 1 illustrates an example of a polyester, according to some embodiments of the present disclosure.

Structure 1

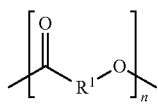

$R^1$ in Structure 1 may include a hydrocarbon chain or branched hydrocarbon (e.g. hydroxy propionic acid, lactic acid, or polyhydroxybutyrate) or an aromatic group including at least one of benzene, anthracene, naphthalene, furan, pyridine, pyrone, pyran, and/or substituted aromatic groups such as hydroxy-, methoxy-, methyl-, ethyl-, butyl-, and/or propyl-substituted aromatics. In some embodiments of the present disclosure, $R^1$ may be an aromatic that further includes at least one of nitrogen, sulfur, oxygen, phosphorous, and/or a halogen. Specific examples of Structure 1, according to some embodiments of the present disclosure include at least one of

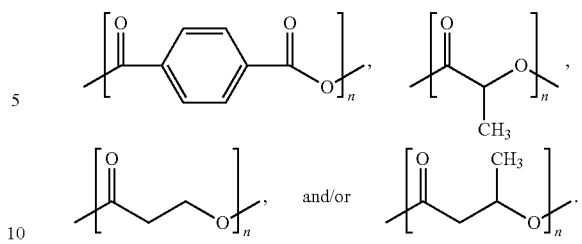

Structure 1 may be deconstructed by its reaction with a diol to produce deconstructed molecules, according to Reaction 1.

Reaction 1

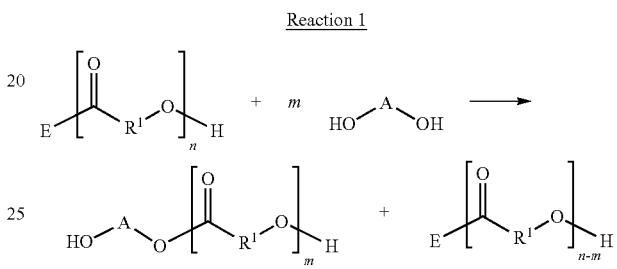

In general, Reaction 1 will result in deconstructed molecules having the general structure of Structure 2, where m is the number of repeat units of the starting polyester, where m is less than n.

Structure 2

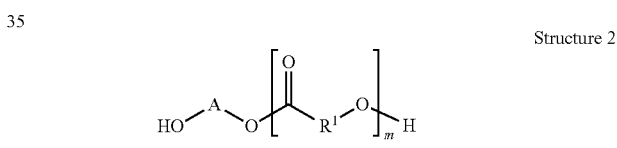

Structure 2 may be further reacted with a bio-derived molecule to produce a copolymer, according to Reaction 2.

Reaction 2

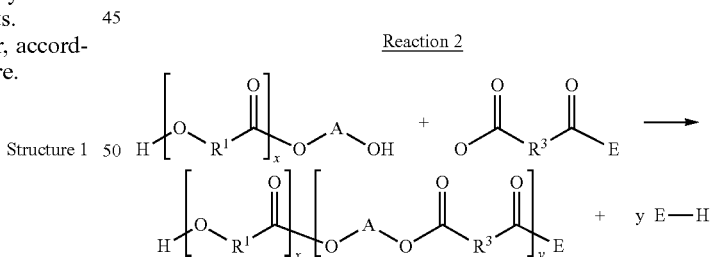

Reactions 3-5 illustrate examples where the bio-derived molecule is capped with hydroxyl groups, chlorine, and ester groups respectively.

Reaction 3

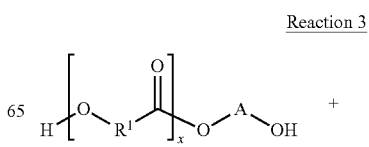

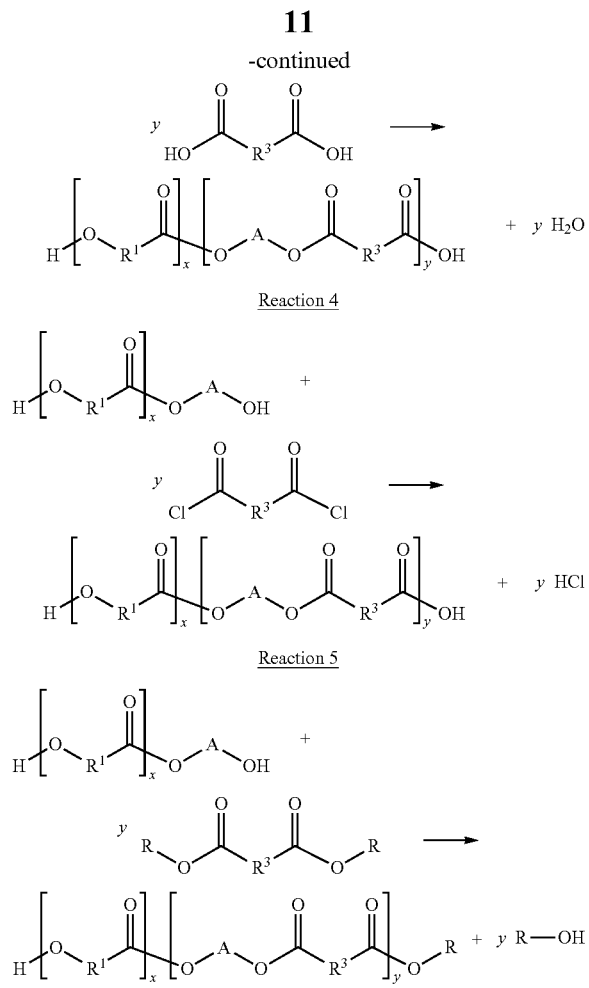

Reaction 4

Reaction 5

The copolymers resulting from Reactions 3-5 have the general structure of Structure 3.

Structure 3

Specific examples of Structure 3 include

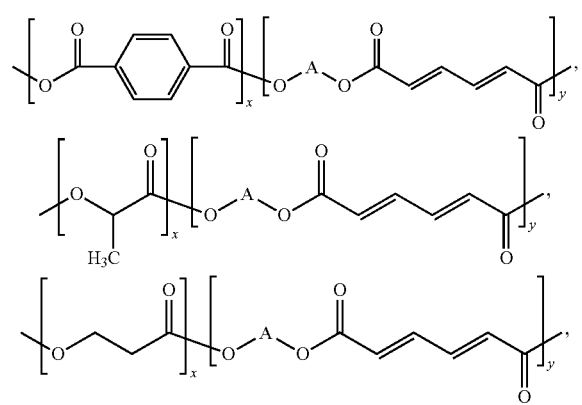

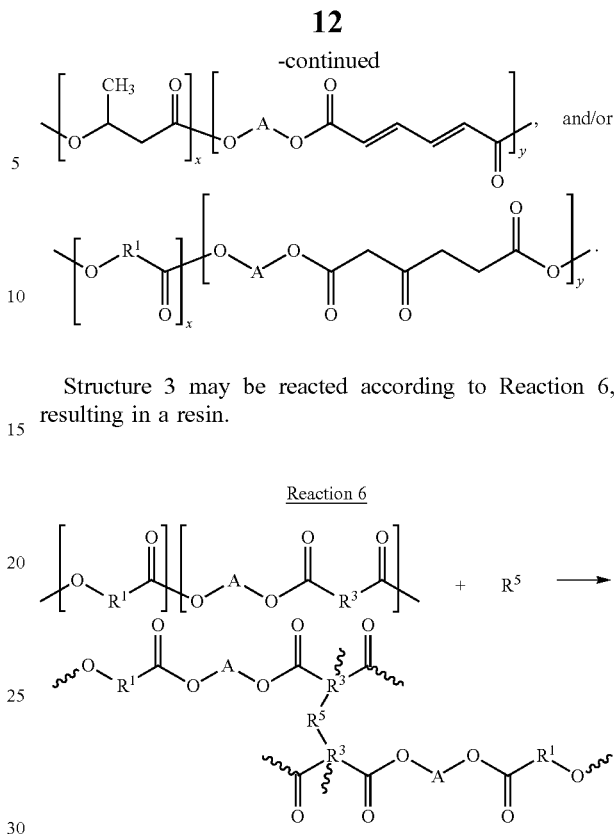

Structure 3 may be reacted according to Reaction 6, resulting in a resin.

Reaction 6

In some embodiments of the present disclosure, a resin may be reacted with a fiber to produce a reinforced plastic. Suitable fibers according to some embodiments of the present disclosure include fiberglass, carbon fiber, basalt fiber, hemp fibers, and/or bamboo fibers.

In some embodiments of the present disclosure, a starting polyester (reclaimed or otherwise) may have between 5 and 10000 repeat units and/or a molecular weight between 1000 and 2000000. In some embodiments of the present disclosure, a deconstructed molecule may have between 5 and 5000 repeat units and/or a molecular weight between 200 and 100000. In some embodiments of the present disclosure, a copolymer may have between 5 and 10000 repeat units and/or a molecular weight between 1000 and 2000000.

Structure 1 may be modified to yield Structure 4, a generalized polyester, according to some embodiments of the present disclosure.

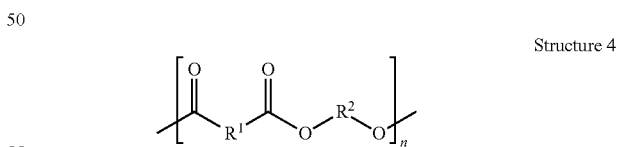

Structure 4

In some embodiments of the present disclosure, $R^1$ may be a benzene group and $R^2$ may be a —C—C— group for the example of PET. Thus, $R^1$ may include an aromatic group including at least one of benzene, anthracene, naphthalene, furan, pyridine, pyrone, pyran, and/or substituted aromatic groups such as hydroxy-, methoxy-, methyl-, ethyl-, butyl-, and/or propyl-substituted aromatics. In some embodiments of the present disclosure, $R^1$ may be an aromatic that further includes at least one of nitrogen, sulfur, oxygen, phosphorous, and/or a halogen. $R^2$ may include any suitable saturated and/or unsaturated, branched or straight-chained hydrocarbon. In some embodiments of the present disclosure R² may be a hydrocarbon group having between one carbon atom and 30 carbon atoms. Thus, in some embodiments of the present disclosure a polyester, reclaimed or otherwise, may include at least one of PET, polybutylene terephthalate, polytrimethylene terephthalate, and/or polyethylene naphthalate, having the following general structures:

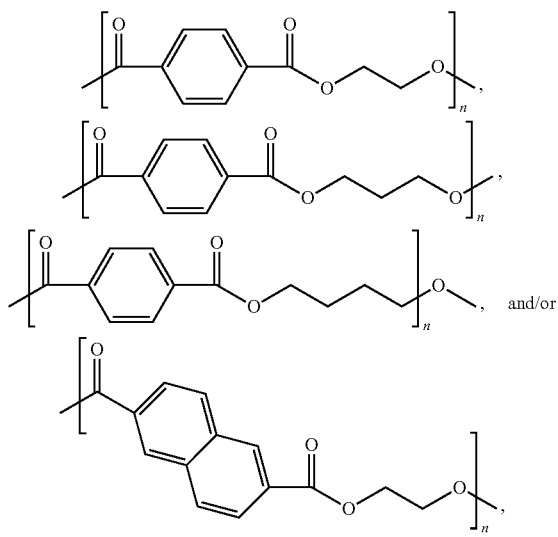

respectively.

Reactions 7-9 show generalized deconstruction reactions of a polyester, according to some embodiments of the present disclosure.

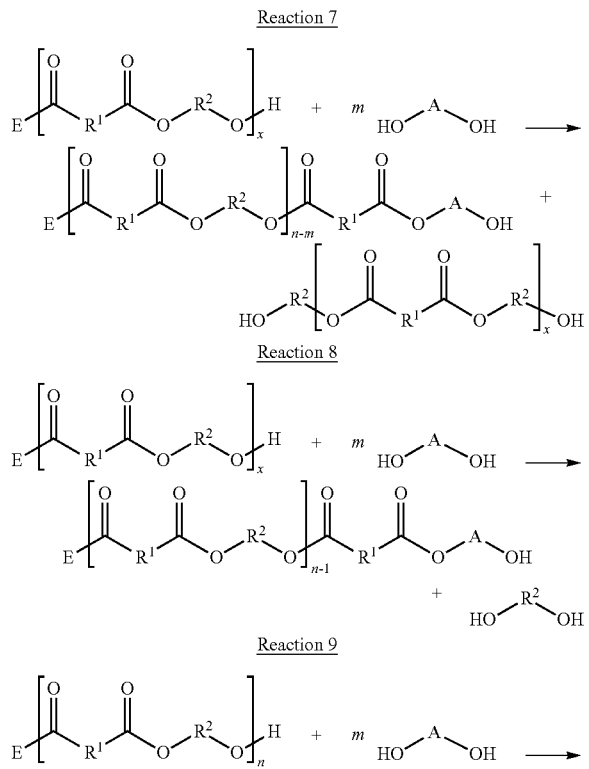

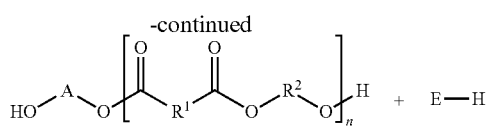

The structure for the generalized deconstructed molecule resulting from Reactions 7-9 is shown in Structure 5. Compare this to the PET deconstructed molecule of Structure 2 above.

Structure 5

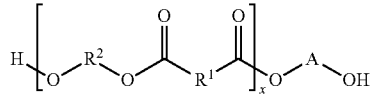

The deconstructed molecule of Structure 5 is shown with hydrogen and/or hydroxyl group end-groups. In some embodiments of the present disclosure Structure 5 and/or structures similar to Structure 5 may be capped with at least one of a halogen, a hydroxyl group, an alcohol, an ester, an alkoxy, a diol, a multifunctional alcohol, a saturated hydrocarbon, a branched hydrocarbon, an aromatic ring, and/or an unsaturated hydrocarbon.

Reaction 10 illustrates a generalized polymerization reaction of a polyester deconstructed molecule with a bio-derived molecule.

Reaction 10

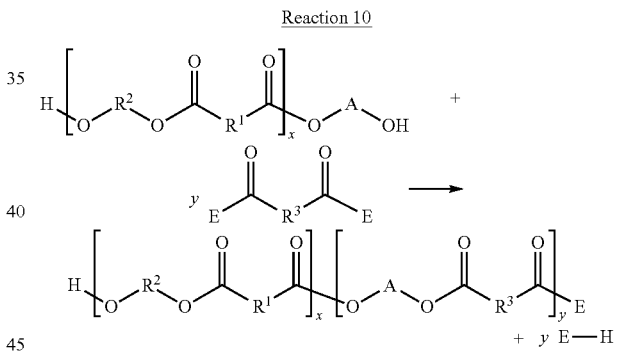

Reaction 10 shows the example of a bio-derived molecule having an R³-group positioned between two end-groups including an E-group. In some embodiments of the present disclosure, an R³-group of a bio-derived molecule may include at least one of an aromatic ring, a substituted aromatic ring, a heteroatom substituted hydrocarbon (e.g. ketones), a saturated hydrocarbon and/or an unsaturated hydrocarbons, where the hydrocarbon may be branched and/or a straight chain. In some embodiments of the present disclosure, the hydrocarbon may include other elements, for example, at least one of nitrogen, sulfur, oxygen, phosphorous, and/or a halogen. In some embodiments of the present disclosure Reaction 10, may correspond the copolymerizing a PET deconstructed product with muconic acid and/or a muconic acid derivative, the R³-group is an unsaturated hydrocarbon chain having two carbon-carbon double bonds and a total of four carbon atoms in a chain or a β-ketoadipic acid containing a β-ketone and a total of four carbons.

Reactions 11-13 below, illustrate examples of the copolymerization of a PET deconstructed molecule with a bioderived molecule to form copolymers, where the bio-derived molecule is capped with hydroxyl end-groups, halogen end-groups (chlorine), and ester groups, respectively. Note that each reaction generates water, HCl, and an alcohol as coproducts, respectively.

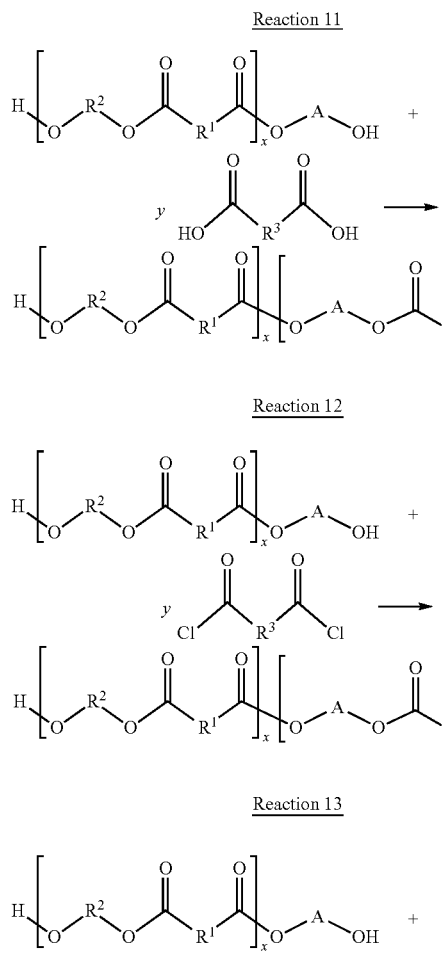

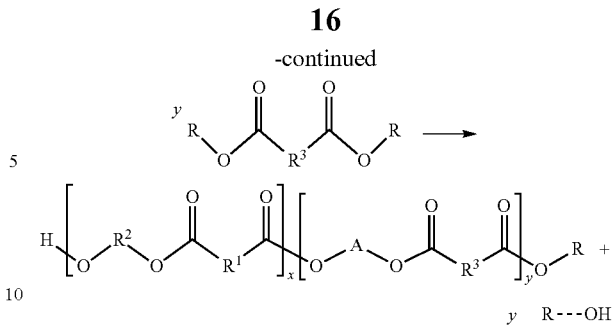

Reaction 14 illustrates another route to a copolymer, according to some embodiments of the present disclosure:

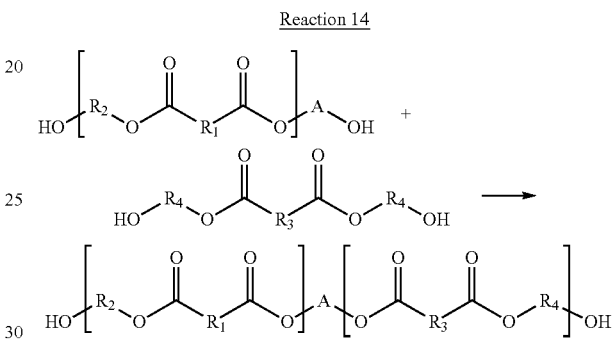

Each of Reactions 11-13 produce a copolymer having the general structure of Structure 6.

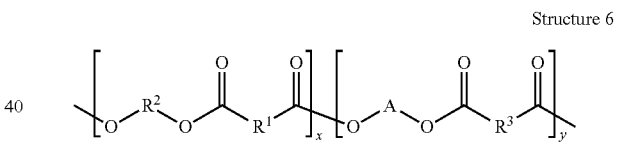

Specific examples of Structure 6 include at least one of

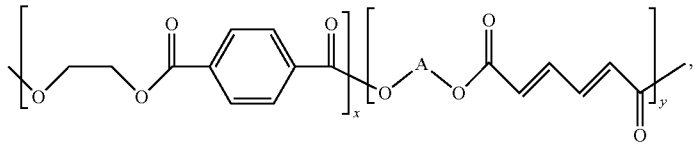

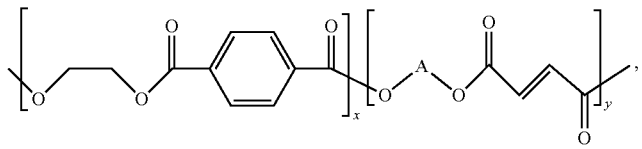

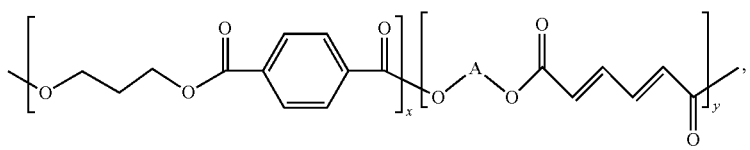

-continued

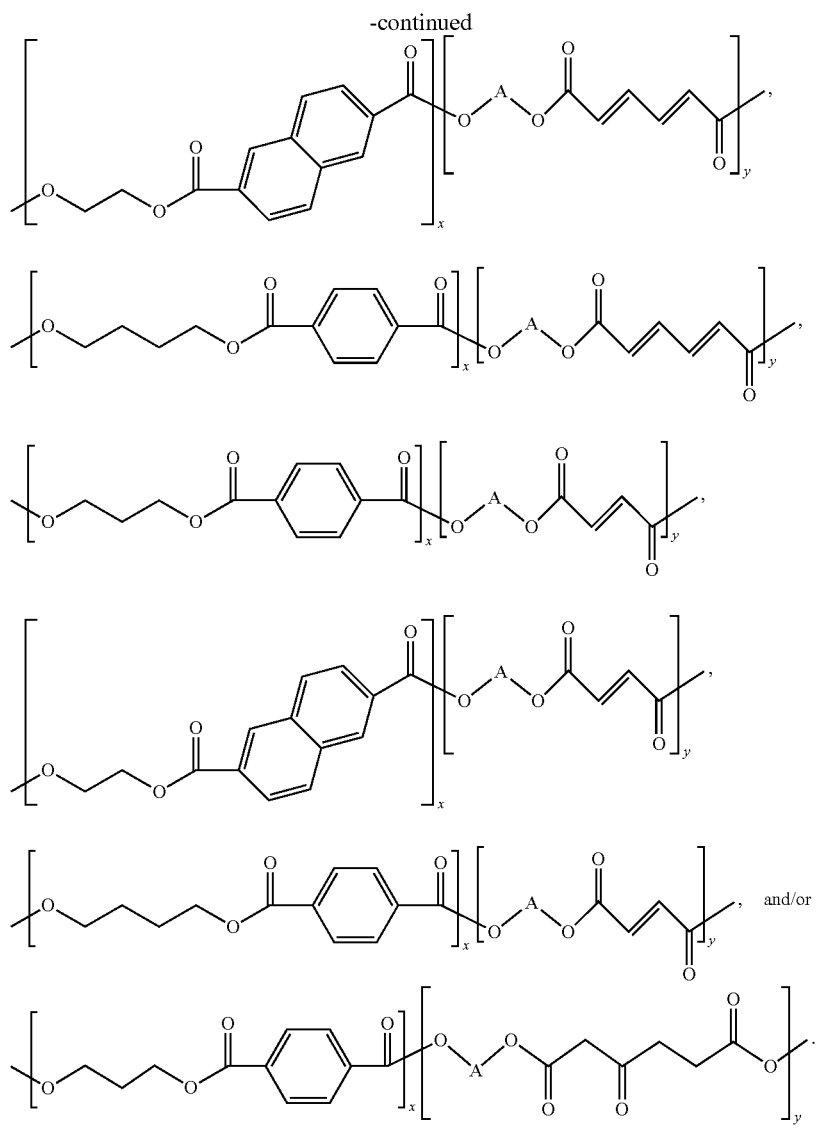

Other examples include

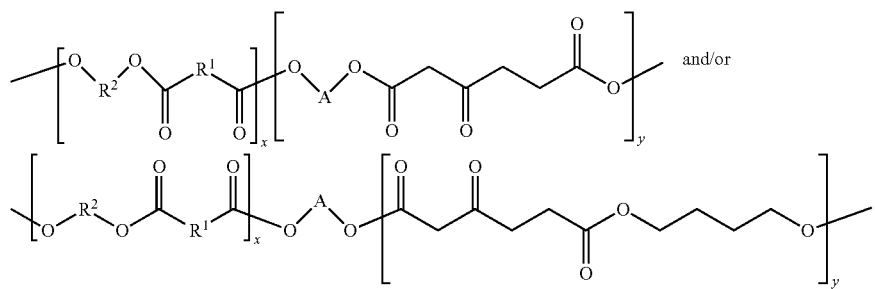

Deconstructed polyester copolymerized with a bio-derived molecule, as illustrated in Structure 6, can also be reacted with a cross-linker to form a resin, as shown in Reaction 15. In some embodiments of the present disclosure, a cross-linker may also serve the purpose of a diluent and/or solvent, where the copolymer is at least partially soluble in the cross-linker.

Reaction 15

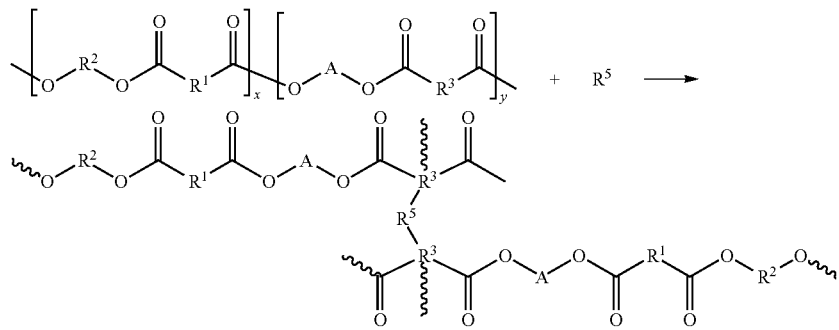

An example of a resin produced by Reaction 15 is Structure 7 below.

Structure 7

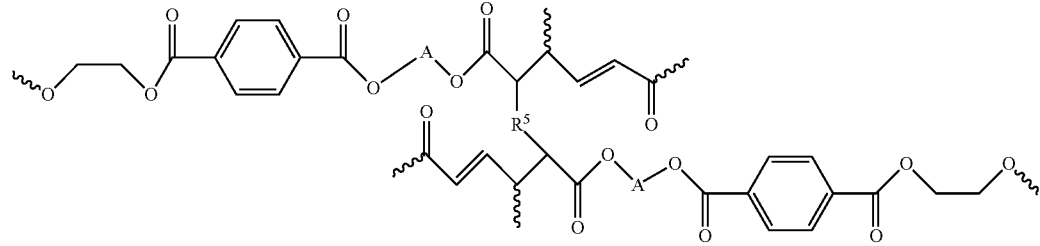

For the example of PET, PET is a hompolymer with a single repeat unit having the structure of Structure 8:

Structure 8

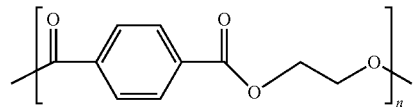

PET may be produced by the condensation polymerization of terephthalic acid and ethylene glycol. As shown herein, in some embodiments of the present disclosure, PET may be deconstructed to smaller molecules by contacting the PET with a diol, such that the diol reacts with the ester groups by transesterification, as shown below in Reaction 16.

Reaction 16

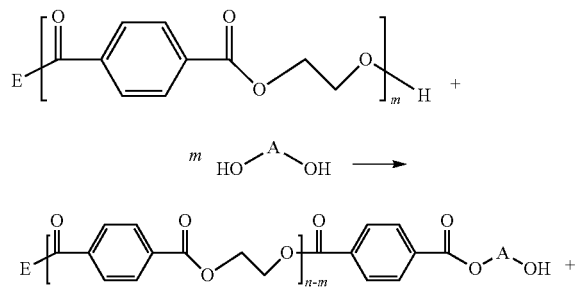

-continued

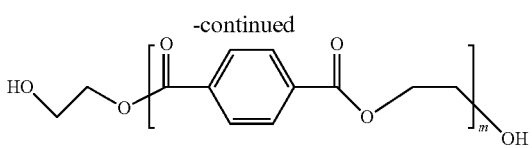

In Reaction 16, the E-group may be any suitable end-group, for example a halogen, a hydroxyl group, an alcohol, an ester, a diol, a multifunctional alcohol, a saturated hydrocarbon, a branched hydrocarbon, an aromatic ring, and/or an unsaturated hydrocarbon. The A-group in the diol may be any suitable group, for example, an aromatic ring, a substituted aromatic ring, a heteroatom substituted hydrocarbon (e.g. ketones), a saturated hydrocarbon and/or an unsaturated hydrocarbon. In some embodiments of the present disclosure a diol may include at least one of ethylene glycol, propanediol, butanediol, and/or benzene-dimethanol. Hydrocarbons may be branched chains and/or unbranched chains. The starting PET molecule, reclaimed or otherwise, may have between 10 and 10000 repeat units (e.g. $10 \leq n \leq 1000$). Reaction 16 shows that the PET may be deconstructed to shorter polymer chains and/or oligomer chains that contain the original terephthalic acid/ethylene glycol repeat unit and that some of these repeat units will also contain the A-group from the diol and may also be capped with hydroxyl end-groups. Hence, the A-groups from the diol are incorporated into polymers, oligomers, and/or monomers resulting from the deconstruction of PET with a diol. The products from Reaction 16, referred to herein as "deconstructed molecules", may be generalized by the following structure, specifically for the example of deconstructed PET, Structure 9

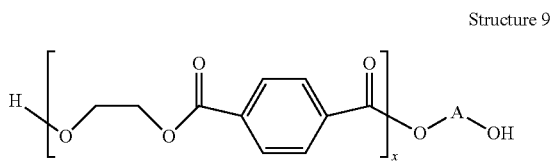

where the number of terephthalic acid/ethylene glycol repeat units in Structure 2 is some value less than the number of repeat units contained in the original source PET, Structure 1, (e.g. 1≤x≤999).

In some embodiments of present disclosure, deconstructed molecules may be reacted with at least one "biosourced molecule" to produce a copolymer. This copolymerization reaction is shown Reaction 2 for the example of copolymerizing PET deconstructed molecules with biosourced muconic acid and/or a derivative of muconic acid.

Reaction 17

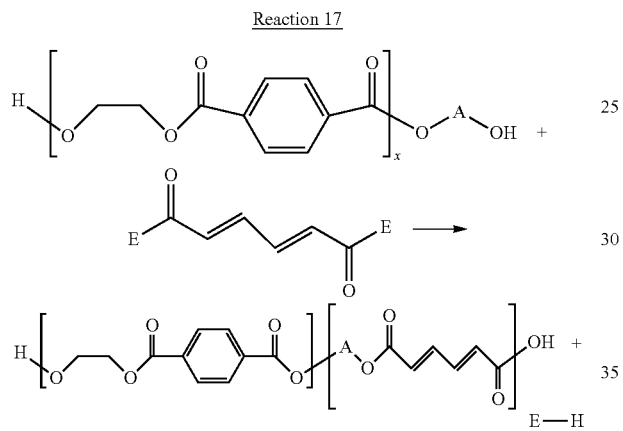

Referring to Reaction 17, the E-group may be any suitable end-group, for example a halogen, a hydroxyl group, an alcohol, an ester, a diol, a multifunctional alcohol, a saturated hydrocarbon, a branched hydrocarbon, an aromatic ring, and/or an unsaturated hydrocarbon. Examples of biosourced molecules include dicarboxylic acids, multifunctional carboxylic acids (e.g. tricarboxylic acid), diesters, multifunction esters, ketone containing molecules, lactone containing molecules, and/or anhydrides. Examples of dicarboxylic acids suitable for some embodiments of the present disclosure include at least one of cis,cis-muconic acid, cis,trans-muconic acid, trans, trans-muconic acid, succinic acid, fumaric acid, malic acid, 2,5 furan dicarboxylic acid, 3 hydroxy propionic acid, aspartic acid, glucaric acid, glutamic acid, β-keto adipic acid, a-keto adipic acid, β-keto glutaric acid, a-keto glutaric acid, and/or adipic acid. Suitable esters, anhydrides, and acyl halides include esters, anhydrides, and acyl halides of the carboxylic acids named above. For example, a suitable diester that may be used in Reaction 17 is the diester of trans, trans-muconic acid or cis, cis-muconic acid, trans, trans-dimethyl muconate and cis, cis-dimethyl muconate. An example of anhydride molecules is maleic anhydride.

Whether or not a reactant or product described herein is "bioderived" may be determined by analytical methods. Using radio carbon and isotope ratio mass spectrometry analysis, the biobased content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14 C) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pNMC value obtained correlates directly to the amount of biomass material present in the sample. Thus, ASTM-D866 may be used to validate that the compositions described herein are and/or are not derived from renewable sources.

Referring again to Reaction 17, the resulting copolymer may be constructed of deconstructed molecules covalently linked to neighboring bio-sourced molecules by the A-group of the diol. Depending on the reaction conditions of Reaction 17, the copolymer may include at least one of the following structures: -ABABABAB-, -AABBAABB-, -[A]$_n$[B]$_m$—, or a random copolymer where the A subunits and B subunits are randomly distributed through the chains of the copolymer, or a multiblock-copolymer where large regions are composed of the same subunit. So, for the example of Reaction 17, subunit A corresponding to Structure 1, and subunit B, having the structure

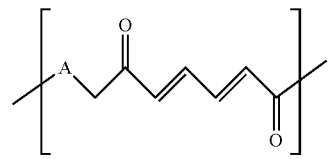

originating from muconic acid and/or a muconic acid derivative, may alternate in any form of an alternating block copolymer and/or each of the subunits may be randomly distributed along the copolymer chains. Such copolymers may be represented by the general structure shown in Structure 10. The same copolymer structure applies to the other copolymer embodiments described herein.

Structure 10

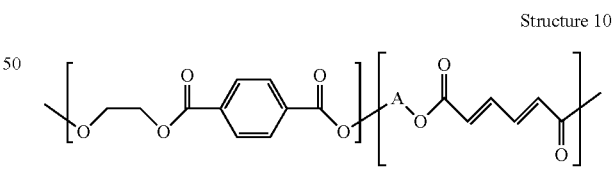

Further, in some embodiments of the present disclosure, a copolymer resulting from the depolymerization of a polyester, for example, Structure 10 for PET copolymerized with muconic acid and/or a muconic acid derivative, may be reacted with a cross-linker (e.g. styrene), either during the copolymerization reaction (for example Reaction 17) and/or in a separate subsequent reaction, resulting in the formation of a resin, as shown above in Reaction 15 for the example of deconstructing PET and copolymerizing the PET deconstructed molecules with muconic acid and/or a muconic acid derivative, resulting in Structure 7. Examples of cross-linkers include styrene, styrenic divinylbenzene, acrylic acid, methacrylic acid, substituted styrenes, styrenic derivatives, methyl methacrylate, methyl acrylate, esters of acrylic acid, esters of methacrylic acid, and/or any suitable vinyl functionalized molecule. In some embodiments of the present disclosure, for example Structure 7 above, $R^5$ may be a benzene ring, a carboxylic acid, an ester, an aromatic ester, a hydrocarbon, and/or any other suitable structure. In some embodiments of the present disclosure $R^5$ may include more than one vinyl group, a sulfur group, and/or any other suitable crosslinking structure. In some embodiments of the present disclosure, a cross-linker may also serve the purpose of a diluent and/or solvent, where the copolymer is at least partially soluble in the cross-linker.

In some embodiments of the present disclosure, a polyester may be deconstructed with a diol to produce at least one deconstructed molecule, where the polyester may be deconstructed in the melt (e.g. where the polymer is the primary component), neat (e.g. in a solution comprised solely of the deconstruction agent) and/or in solution using a solvent (e.g. typically a none reactive solvent such as DMSO). The reaction can occur between 30 minutes and 12 hours, with or without a catalyst (e.g. a catalyst may include an esterification or transesterification catalyst such as titanium (IV) butoxide or Stannous Octoate), with stirring/mechanical agitation, at a temperature between room temperature up to 400 C, under nitrogen purge or vacuum, and/or in solvents under reflux.

In some embodiments of the present disclosure, deconstructed molecule may be reacted with a bio-derived molecule to form a copolymer, where the polymerization is performed neat and/or in solution using a solvent. The reaction can take place under mechanical agitation at a temperature between 100 C and 400 C, either under nitrogen purge or vacuum, for a period from 1 minute to 12 hours, and with or without catalyst (e.g. a catalyst may include an esterification or transesterification catalyst such as titanium (IV) butoxide or Stannous Octoate). In some embodiments of the present disclosure, a copolymer may be cross-linked using a cross-linker to produce a resin, where the reacting to form the resin is performed neat and/or in solution using a solvent, with an initiator (e.g. free-radical, ionic, etc.) or under UV, at a temperature between ambient and 200 C, for a period between 1 minute and 2 days.

In some embodiments of the present disclosure, maleic anhydride may be ring-opened according to Reaction 18 below, and subsequently reacted with a polyester deconstructed molecule to produce a copolymer according to Reaction 19.

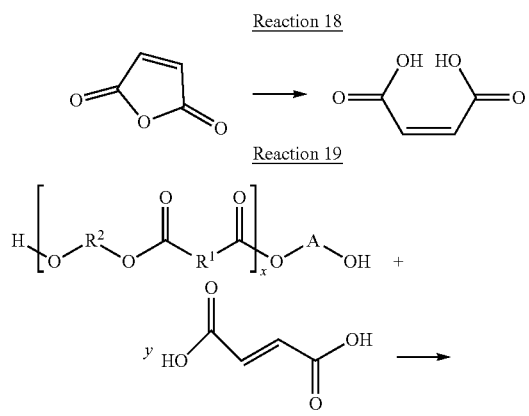

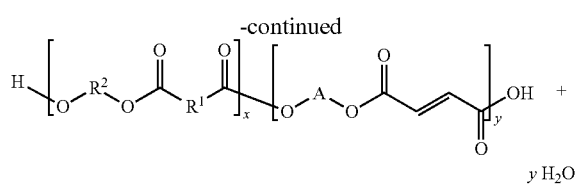

In some embodiments of the present disclosure, a polyester deconstructed molecule may be reacted according to Reaction 20.

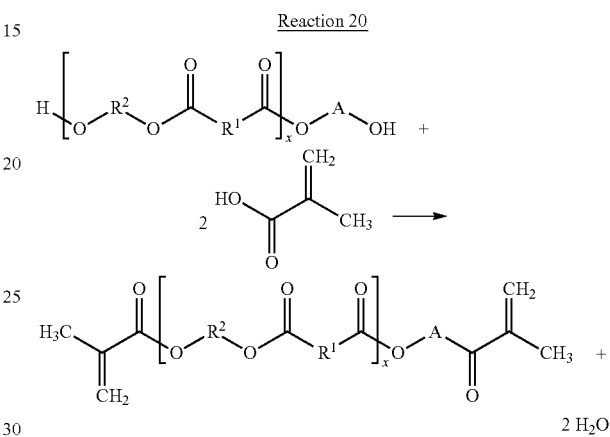

In some embodiments of the present disclosure, PET, reclaimed or otherwise, may be deconstructed (depolymerized) using at least one reactant, for example a diol. The resultant deconstruction products, referred to herein as deconstructed molecules, may include at least one of a PET-derived monomer, oligomer, and/or polymer, for example, mono-hydroxy ethyl terephthalate (MHET), bis-2-hydroxyethyl terephthalate (BHET), oligomers and/or polymers thereof. For example, a deconstructed molecule resulting from the deconstruction of PET may be an oligomer and/or polymer of MHET ethyl benzene-1,4-dicarboxylate.

In some embodiments of the present disclosure, a PET-derived deconstructed molecule resulting from the deconstruction reaction of PET with a reactant (e.g. diol) may be transformed into a macromolecule, wherein the term "macromolecule", as used herein, refers to any polymer (e.g. homopolymer, copolymer, etc.), cross-linked polymer (e.g. resin), reinforced polymer and/or resin (e.g. fiberglass reinforced plastic (FRP), and/or combinations thereof. For example, in some embodiments of the present disclosure, macromolecules having structures similar to unsaturated polyesters (UPE) and/or vinyl esters (VE), may be produced by reacting a PET-derived deconstructed molecule with at least one bioderived monomer. Examples of bioderived monomers include bioderived carboxyl group-containing molecules such as at least one of muconic acid, fumaric acid, methacrylic acid, and/or acrylic acid. Other examples of bioderived monomers include the esters of bioderived carboxyl group-containing molecules (e.g. where the carboxyl group is converted to an ester group.) In addition, a bio-derived monomer may be saturated and/or unsaturated (e.g. containing at least one carbon-carbon double bond and/or carbon-carbon triple bond). In some embodiments of the present disclosure, a first macromolecule in the form of at least one of a polymer and/or a copolymer (e.g. a UPE and/or a VE) may be simultaneously and/or subsequently reacted with a cross-linker (e.g. styrene, methacrylic acid, and/or acrylic acid) around a reinforcing matrix (e.g. woven mat, such as a fiberglass) to produce a second macromolecule, a reinforced plastic, for example, a fiberglass reinforced plastic (FRP). As shown herein, for the examples of methacrylic and acrylic acid as cross-linkers, the resultant FRPs have demonstrated favorable processability and final properties. In some embodiments of the present disclosure, a first macromolecule in the form of at least one at least one of a polymer and/or a copolymer may be simultaneously and/or subsequently reacted with a cross-linker to form a second macromolecule, for example, a resin.

In some embodiments of the present disclosure, at least one deconstructed molecule resulting from the deconstruction of PET, for example terephthalic acid, ethylene glycol, BHET, and/or MHET, and/or a PET polymer (e.g. virgin PET, deconstructed PET, and/or reclaimed PET) may be reacted with at least one bioderived monomer and/or homopolymer that contains rigid moieties (e.g. poly(butylene β-keto adipate, keto-glutaric acids, and/or any other suitable) to produce biodegradable macromolecules that may provide environmentally friendly PET alternatives. As shown herein, a comparison of polyethylene to poly(butylene adipate-co-terephthalate) (PBAT), a biodegradable alternative to polyethylene, the presence of rigid and biodegradable moities provide the PBAT polymers with physical and performance properties comparable to PET (e.g. glass transition, melting temperature, permeability, etc.). The demonstrates the feasibility of of replacing, at least partially, PET macromolecules with comparable biodegradable polymers.

In some embodiments of the present disclosure, PET may be deconstructed to a terephthalate ester (e.g. dimethyl terephthalate), which may then be converted to a dinitrile and subsequently to a diamine. The diamine may then be directly blended with reclaimed PET, or with neat terephthalic acid, terephthaloyl chloride, and/or a terephthalate ester, to synthesize a polyaramid which may possess properties similar to commercially available polyaramids (e.g. Kevlar).

In some embodiments of the present disclosure, reclaimed PET may be converted to a diester and/or diacid, which may be subsequently converted to a diol. This diol may then undergo a wide variety of transformations such as dehydration to form divinyl benzene and/or direct reaction with a difunctional monomer (e.g. carbamate) to form a polymer (e.g. polycarbonate).

FIG. 1 illustrates a method 100 for producing materials (either copolymers and/or fiberglass reinforced plastics/FRPs) 140 based on the reacting 130 of a bio-sourced monomer/oligomer/polymer 132 with a polyester-derived monomer/oligomer/polymer; a deconstructed molecule 115. The polyester-derived deconstructed molecule 115 may be obtained, for example, by depolymerizing reclaimed PET, as described herein. In some embodiments of the present disclosure, a reclaimed polyester 102 may be deconstructed (e.g. depolymerized) by reacting the reclaimed polyester 102 with a diol 104. In some embodiments of the present disclosure a diol, may be supplemented and/or replaced with a base, a salt, an alcohol, and/or a diamine.

In some embodiments of the present disclosure, the polyester deconstructing 110 may be achieved by loading a solid polyester with a diol 104 (e.g. ethylene glycol, hexanediol, and/or butanediol) and a suitable catalyst (e.g. at least one of titanium butoxide, sodium methoxide, a Lewis basic catalyst, and/or a transesterification catalyst) and heating the resultant mixture to an elevated temperature (e.g. up to or near the boiling point of the diol; e.g. 220° C.) under mechanical stirring and inert conditions. The resultant mixture containing at least one polyester-derived deconstructed molecule 115 may be directed to a treating 120 step to purify the deconstructed molecule 115 by removing any unreacted diol 104 (e.g. and/or other materials) and/or any impurities (e.g. colorants), resulting in the formation of at least one purified PET-derived deconstructed molecule 125. In some embodiments of the present disclosure, the treating 120 may include directing a treating component, for example, a purifying agent 122, to the treating 120 step, to be mixed with the at least of the deconstructed molecules 115. The treating component, e.g. purifying agent, 122 may be any suitable liquid, gas, and/or solid. In some embodiments of the present disclosure, the purifying agent 122 may be a liquid, including at least one of water and/or an organic liquid. The treating 120 may be achieved by any suitable unit operation, including liquid extraction, filtration, distillation, etc.

Referring again to FIG. 1, according to some of the embodiments described above, at least one purified polyester-deconstructed molecule 125, e.g. at least one of a MHET monomer, oligomer, and/or polymer and/or at least one of a BHET monomer, oligomer, and/or polymer thereof, may be mixed with at least one bio-sourced molecule 132, for example, a dicarboxylic olefinic acid and/or and anhydride to produce a copolymer 140, for example, an unsaturated polyester. In some embodiments, and/or in addition to, at least one purified polyester-derived deconstructed molecule 125 may be reacted with at least one bio-sourced molecule 132, for example, a monocarboxylic olefinic acid to produce a copolymer 140, for example, a vinyl ester. Referring again to FIG. 1, a cross-linker/diluent 134 may be directed to the reacting 130, wherein the cross-linker/diluent 134 may react with at least one of the purified polyester-derived deconstructed molecules 125 and/or the at least one bio-sourced molecules 132, such that the cross-linker/diluent 134 is incorporated into the resultant copolymer 140. In addition to reacting with at least one of the purified polyester-derived deconstructed molecules 125 and/or at least one of the bio-sourced molecules 132, the cross-linker/diluent 134 may act as a solvent in which the polymerizing reactions may occur. It should be noted that in some embodiments of the present disclosure, the method 100 shown in FIG. 1, may not include the treating 120 step.

Figure 2:
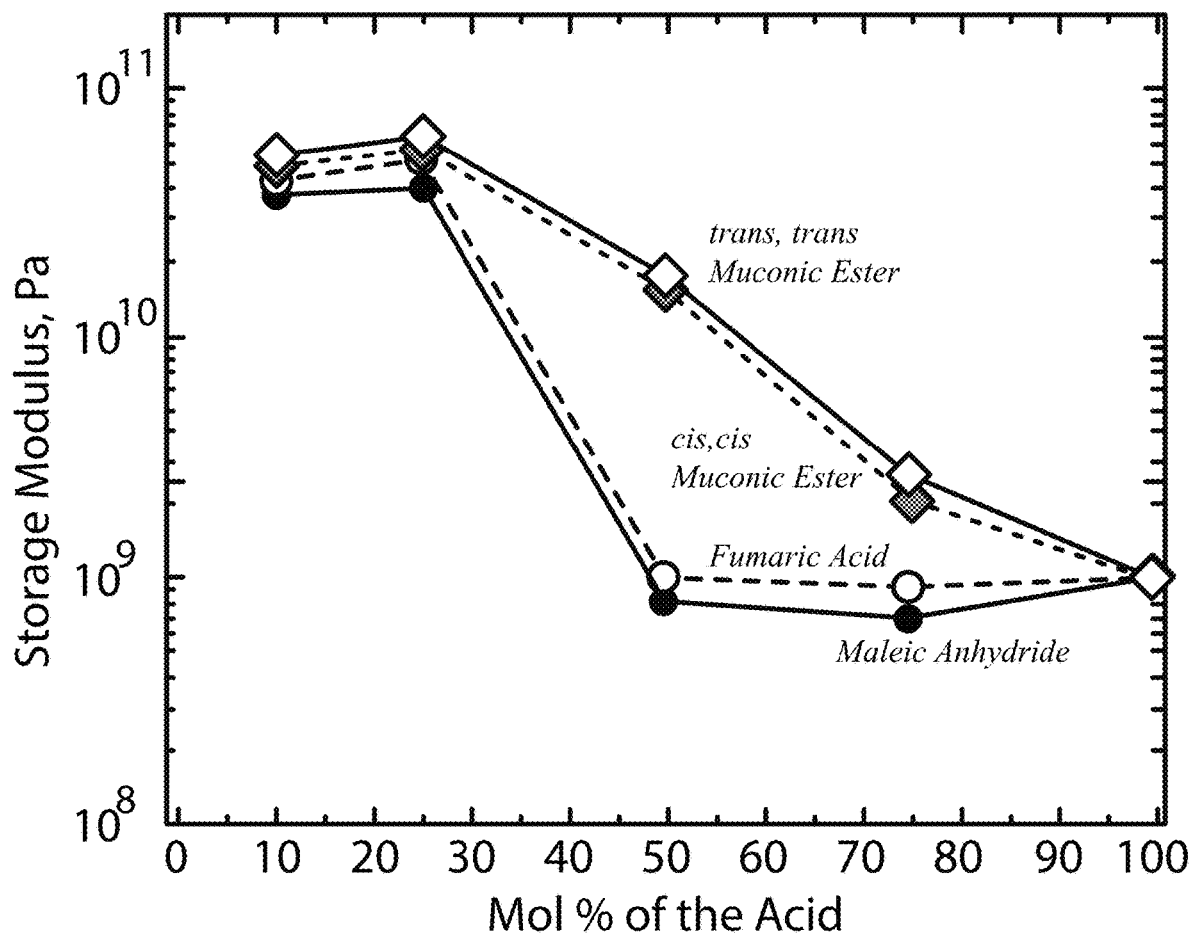
FIGS. 2 and 3 summarize experimental results, the storage moduli of copolymers formed according to some embodiments of the methods described herein.
Figure 3:
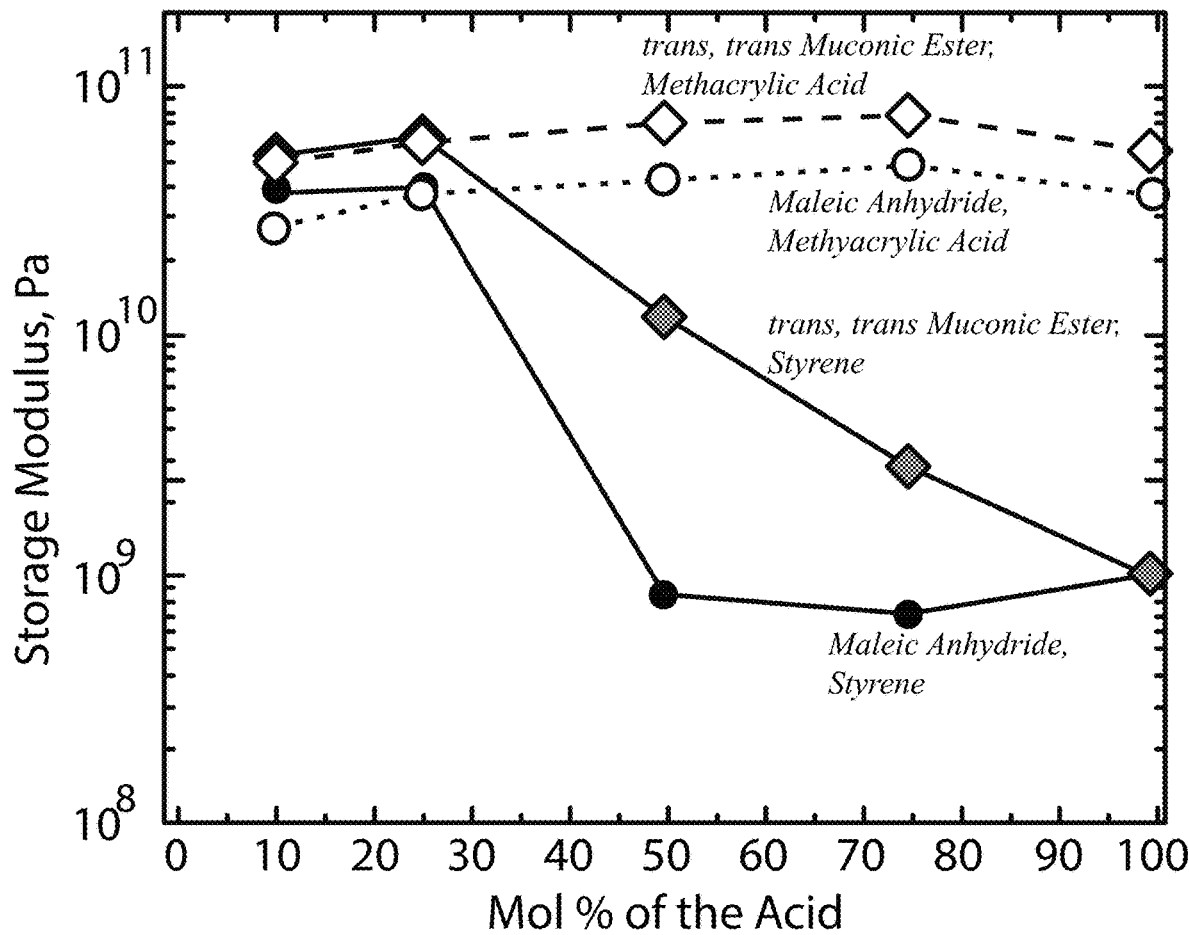
Figure 4:
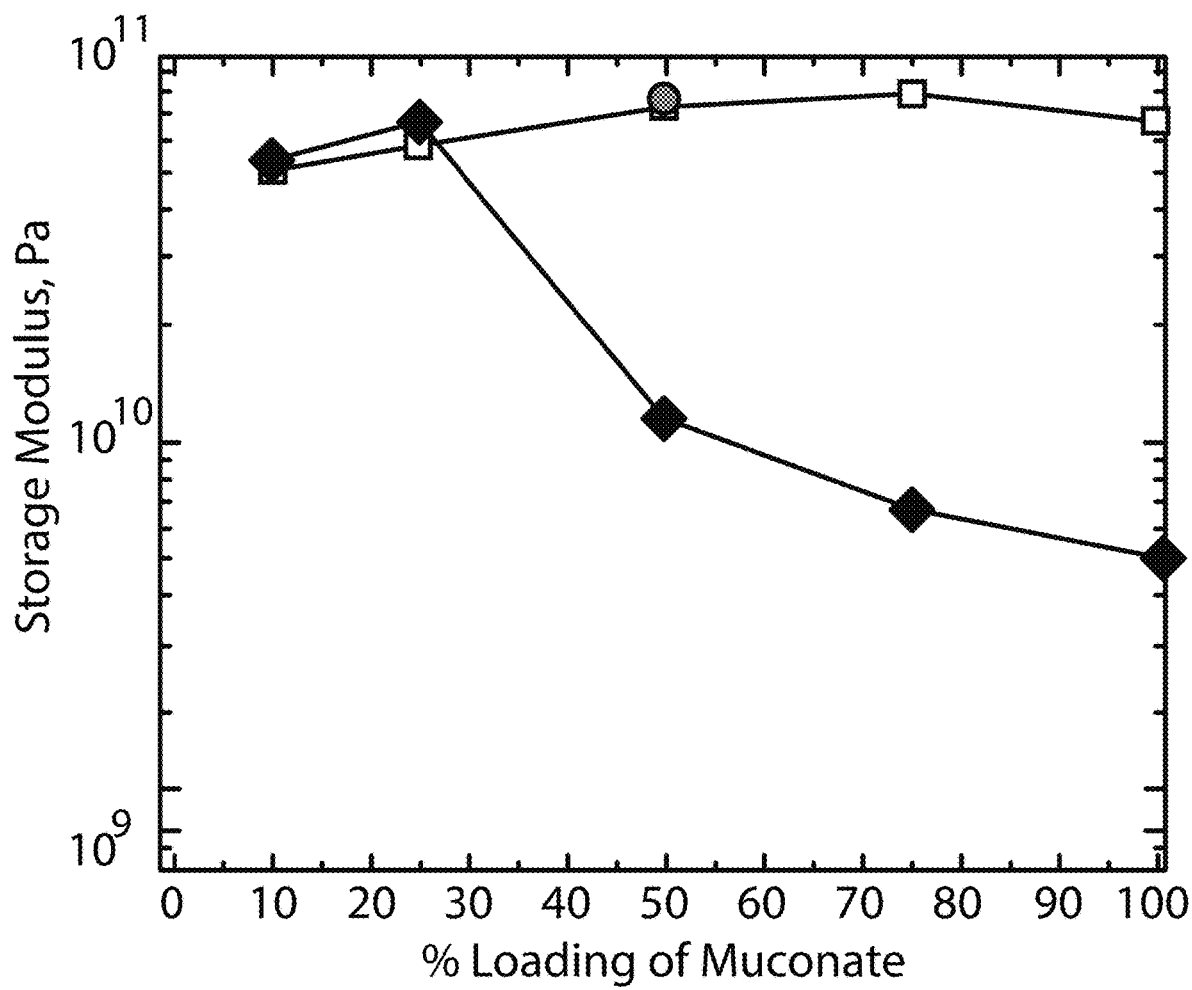
FIG. 4 illustrates additional storage moduli data obtained by polymerizing at least one PET-derived deconstructed molecules with metharylic acid (squares), acrylic acid (circles), and styrene (triangles), according to some embodiments of the present disclosure.
Figure 5:
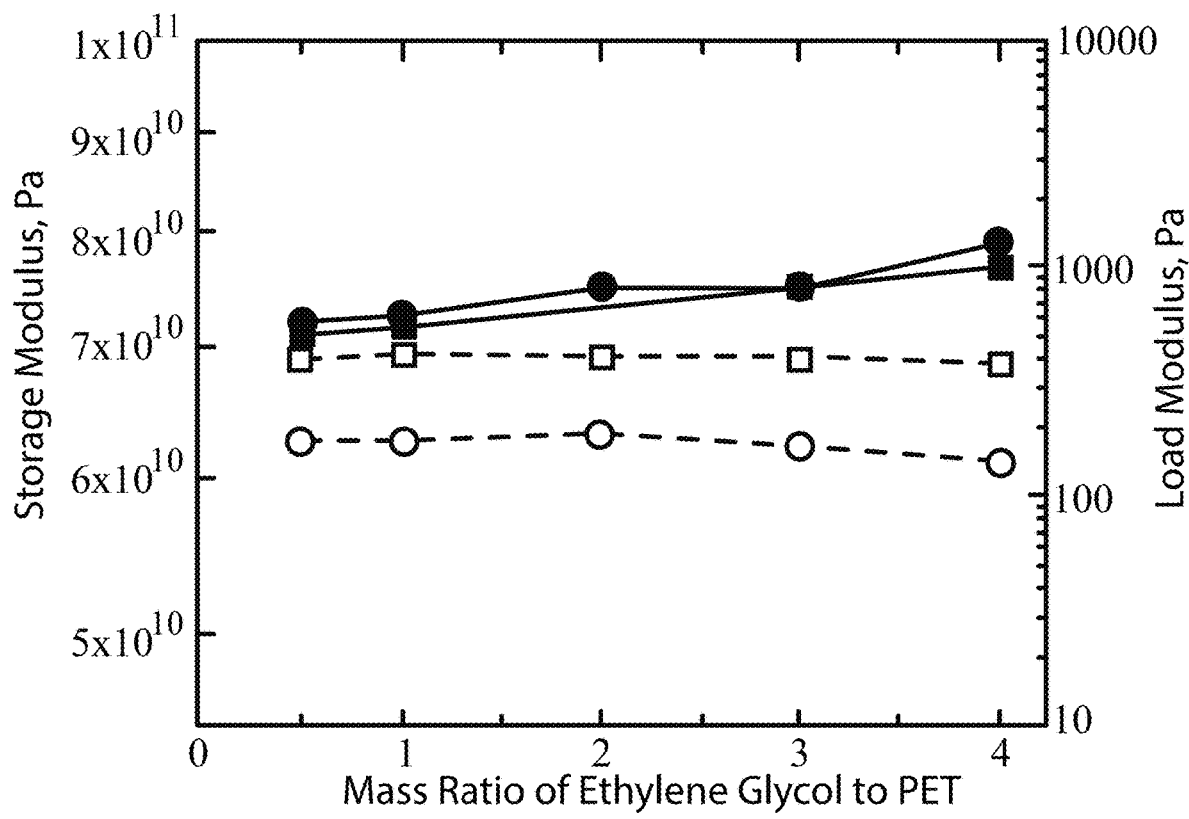
FIG. 5 illustrates further data regarding the incorporation of methacrylic acid (squares) and acrylic acid (circles) cross-linker/diluents into polymers containing either of these and at least one PET-derived deconstructed molecule, according to some embodiments of the present disclosure.

FIGS. 2 and 3 summarize experimental results, the storage moduli of copolymers formed according to some embodiments of the methods described herein. Specifically, reclaimed PET was deconstructed to form at least one PET-derived monomer/oligomer/polymer, which was subsequently combined and polymerized with several bio-sourced monomers and a cross-linker/diluent. For these experiments, the bio-sourced monomers included muconic acid, maleic anhydride, and fumaric acid. In addition, polymerization with at least one PET-derived monomer/oligomer/polymer was also tested with styrene as the cross-linker/solvent. FIGS. 2 and 3 illustrate that muconic acid, maleic anhydride, and fumaric acid were each successfully incorporated into copolymers containing at least one PET-derived monomer/oligomer/polymer, and several examples of biodegradable UPE PET alternatives were successfully synthesized. FIG. 4 illustrates additional storage moduli data obtained by polymerizing at least one PET-derived monomer/oligomer/polymer with metharylic acid (squares), acrylic acid (circles), and styrene (triangles). FIG. 5 provides further data regarding the incorporation of methacrylic acid (squares) and acrylic acid (circles) cross-linker/diluents into polymers containing either of these and at least one PET-derived monomer/oligomer/polymer. In the case for the UPE the experimental results demonstrate no dependence on deconstruction/molecular weight. However, for the vinyl ester version, in which a monocarboxylic acid is used, the properties depend on molecular weight.

Figure 6:
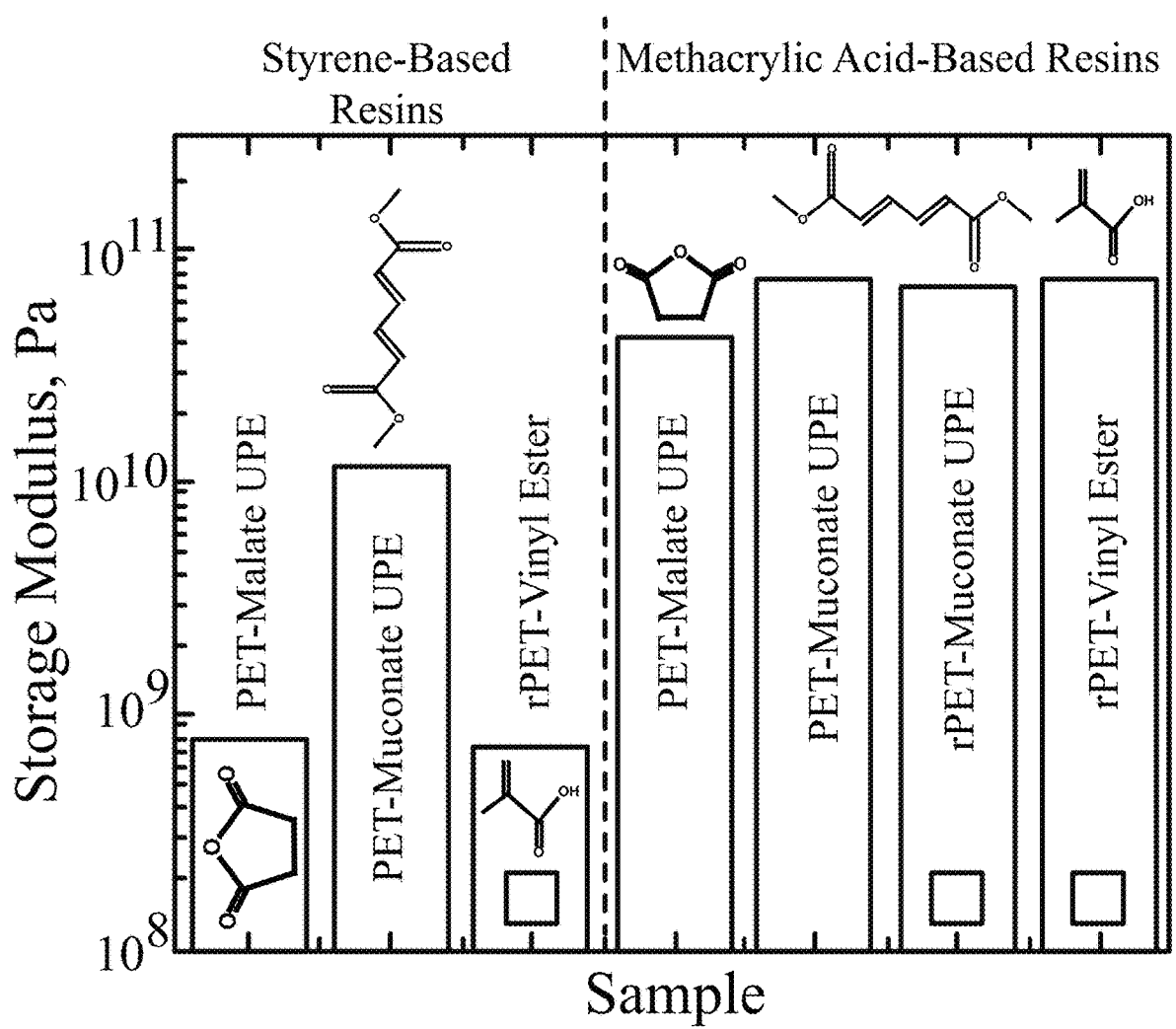
FIG. 6 compares the storage moduli of various copolymers produced according to some embodiments of the present disclosure.

FIG. 6 compares the storage moduli of various copolymers produced according to some embodiments of the present disclosure. The left three columns were made using styrene as the cross-linker/diluent, whereas the right four columns were made using methacrylic acid as the cross-linker/diluent. PET refers to copolymers produced by polymerizing ethyl benzene-1,4-dicarboxylate with various bio-sourced monomers/oligomers/polymers, whereas rPET refers to copolymers produced using monomers/oligomers/polymers derived from reclaimed PET with the same bio-sourced monomers/oligomers/polymers. The comparisons shown in FIG. 6 illustrate that the rPET copolymers demonstrate essentially identical storage moduli as the PET copolymers. FIG. 6 also illustrates that copolymers having higher storage moduli resulted from the use of methacrylic acid as the cross-linker/diluent, whereas styrene as the cross-linker/diluent performed less favorably, where both the methacrylic acid and the styrene act as both a solvent and a cross-linker; e.g. as reactive diluents.

Scheme 1 illustrates another embodiment of the present disclosure, a biodegradable PET alternative, where v and w may be any integer value between 1 and 1000.

bio-sourced monomer/oligomer/polymer, e.g. with at least one of a dicarboxylic acid, a monocarboxylic acid, and/or an anhydrides, with specific examples including at least one of muconic acid, fumaric acid, β-keto adipic acid, and/or maleic anhydride.

EXAMPLES

PET Deconstruction:

PET was deconstructed with butanediol or ethylene glycol. Initially, PET was placed into a round bottom flask affixed with a condenser. Variable amounts of the diol were loaded into the reactor with 0.5 wt % titanium butoxide and the reactor was heated up to 220° C. The transesterification reaction proceeded under reflux for 4 hours. Following the reaction, the slurry was removed from the reactor and washed with an excess of water to remove unreacted diol and any ethylene glycol that was removed via transesterification. The polymer-water mixture was subsequently filtered, and the solid polymer precipitate was vacuum dried for 24 hours to remove excess moisture and diol.

Homopolymer Synthesis:

Initially, poly(ethylene terephthalate-co-fumarate), poly (ethylene terephthalate-co-malate), and poly(ethylene terephthalate-co-muconate) were synthesized via melt transesterification with reclaimed PET bottles. Initially, the reactor (a three-necked round bottom flask attached with nitrogen, overhead mechanical stirring motor, and Dean-Stark condenser setup) was loaded with a fixed molar ratio of deconstructed PET to diacid/diester/anhydride and 0.5 wt %

Scheme 1

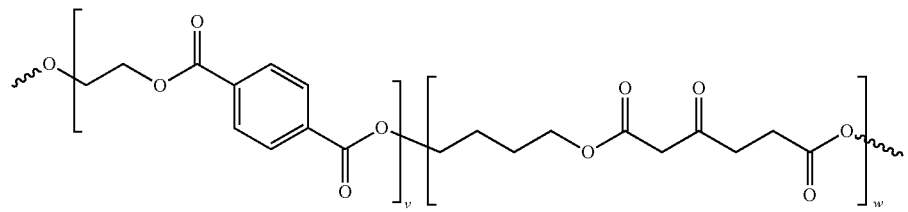

In this example, the adipic acid of PBAT may be replaced with a monomer and/or polymer that is more rigid than adipic acid, in this example butylene-β-keto adipate, to produce a modified copolymer, indicated here as PBKAT. Table 1 below summarizes the glass transition temperatures and melting temperatures of PET and PBKAT at different molar loadings of butylene-β-keto adipate.

TABLE 1

| Polymer | $T_g$ | $T_m$ |
|---|---|---|
| PET | 70 | 260 |
| PBKAT - 5% | 70 | 260 |
| PBKAT - 10 % | 70 | 260 |
| PBKAT - 20 % | 70 | 260 |
| PBKAT - 50 % | 70 | 260 |
| PBKAT | 70 | — |

Thus, the present disclosure relates to a variety of unique copolymers derived from the polymerization of at least one PET-derived monomer/oligomer/polymer derived from at least one of neat monomers, virgin PET, and/or reclaimed PET (e.g. at least one of MEET and/or BHET monomers and/or oligomers and/or polymers thereof) with at least one titanium butoxide as the transesterification catalyst. The reaction vessel was heated to 180° C. and polymerization was allowed to proceed for 6 hours. This prevented molecular weight growth of the polymer chain while allowing the olefinic monomers to be incorporated into the polymer backbone.

To synthesize the virgin-PET copolymers, the reactor was loaded with 1.1 molar equivalents of diol to 1 molar equivalent of total diacid/diester/anhydride with no transesterification catalyst. The reaction vessel was initially heated to 180° C. and polymerization was allowed to proceed for 1 hour. After an hour, the temperature was increased to 220° C., vacuum was applied to the system, and the reaction was allowed to proceed for 5 hours. This resulted in a polymer with a molecular weight on the order of $3*10^4$ g/mol that was used in comparison to the deconstructed PET.

Diacrylic Polymer Synthesis:

The reactor was initially loaded with 40 wt % PET and 60 wt % olefinic acid (acrylic or methacrylic acid) and was allowed to reflux for 6 hours. Following reflux, AIBN (the free radical initiator) was added to the reaction mixture which was subsequently aliquoted for direct use in composite synthesis.

Fiberglass Reinforced Plastic (FRP) Synthesis:

Composites were prepared by either preparing a solution of 39.5 wt % olefinic polymer and 59.5 wt % olefinic acid with 1.0 wt % AIBN as an initiator, or by mixing the final vinyl ester solution. The reaction mixture was applied to 2-ply Bondo™ fiberglass mat, placed between two sheets, and allowed to react for 6 hours at 80° C. Following the reaction, the fiberglass was placed in a vacuum oven for at least 48 hours to allow for any excess monomer to evaporate. Samples were weighed after vacuum drying and no significant weight loss was observed.

Structural Characterization:

Polymer structure was ascertained via a Bruker Avance III HD 400 MHz NMR Spectrometer with a 5 mm BBO probe. Quantitative $^1$H spectra were acquired with a 90° pulse of 14.5 μs and a 30 s recycle delay at room temperature. Deuterated trifluoroacetic acid (99.9% Cambridge Isotope Lab) with 1% w/w TMS was used as the solvent. Molecular weight was determined via the use of a Wyatt GPC equipped with a Tosoh Column, Multiangle Light Scatter, and RI detector. HFIP was used as the elution solvent at a flow rate of 0.5 mL/min.

Physical Property Testing:

After vacuum drying, the composites were cut into a 60×12×2 mm pieces for mechanical testing. Mechanical tests were performed on a TA Instruments Q800 Dynamic Mechanical Analyzer at 35° C. across a range of frequencies from 0.01 to 10 Hz. Thermal characterization was completed by the use of a TA Instruments Q1000 Digital Scanning calorimeter and a Q500 Thermogravimetric Analyzer using ramp rates of 10° C./min.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

The invention claimed is:

1. A composition comprising:
a structure comprising

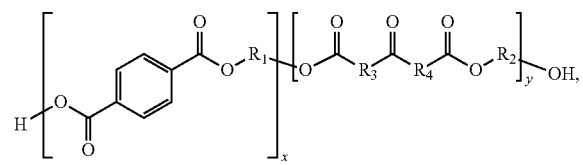

wherein:
$R_1$ comprises a hydrocarbon,
$R_2$ comprises a hydrocarbon,
$R_3$ comprises at least one of a hydrocarbon or a covalent bond,
$R_4$ comprises at least one of a hydrocarbon or a covalent bond,
$1 \leq x \leq 1000$, and
$1 \leq y \leq 1000$.

2. The composition of claim 1, wherein $R_1$ further comprises at least one of oxygen, nitrogen, sulfur, phosphorus, or a halogen.

3. The composition of claim 1, wherein $R_2$ further comprises at least one of oxygen, nitrogen, sulfur, phosphorus, or a halogen.

4. The composition of claim 1, wherein $R_3$ further comprises at least one of oxygen, nitrogen, sulfur, phosphorus, or a halogen.

5. The composition of claim 1, wherein the structure comprises at least one of

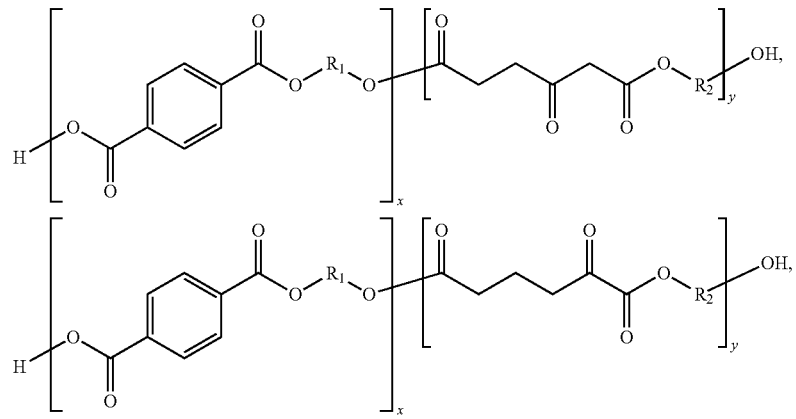

-continued

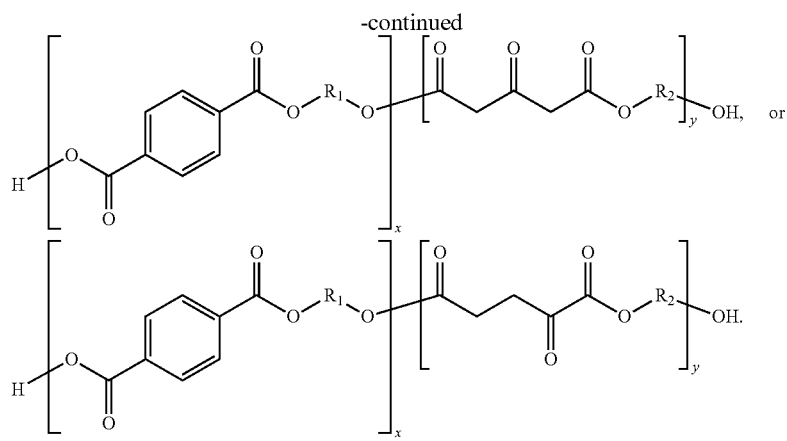

6. The composition of claim 1, further comprising $R_5$, wherein:
  $R_5$ comprises a hydrocarbon that covalently links a first occurrence of the structure to a second occurrence of the structure,
  $R_5$ is positioned between $R_3$ of the first occurrence and $R_3$ of the second occurrence, between $R_4$ of the first occurrence and $R_4$ of the second occurrence, between $R_3$ of the first occurrence and $R_4$ of the second occurrence, or between $R_4$ of the first occurrence and $R_3$ of the second occurrence, and
  $R_5$ is derived from a molecule having at least one vinyl group.

7. The composition of claim 6, wherein $R_5$ is derived from at least one of styrene, styrenic divinylbenzene, acrylic acid, or methacrylic acid.

8. The composition of claim 1, wherein $R_1$ comprises between 1 and 10 carbon atoms, inclusively.

9. The composition of claim 1, wherein $R_2$ comprises between 1 and 10 carbon atoms, inclusively.

10. The composition of claim 1, wherein $R_3$ comprises between 1 and 10 carbon atoms, inclusively.

11. The composition of claim 1, further comprising a fiber, wherein the structure and the fiber form a reinforced plastic.

12. The composition of claim 11, wherein the fiber comprises at least one of fiberglass, carbon fiber, basalt fiber, or a bio-derived fiber.

13. The composition of claim 8, wherein $R_1$ comprises between 2 and 5 carbon atoms.

14. The composition of claim 9, wherein $R_2$ comprises between 2 and 5 carbon atoms.

15. The composition of claim 10, wherein $R_3$ comprises between 2 and 5 carbon atoms.

16. The composition of claim 1, wherein the structure comprises at least one of

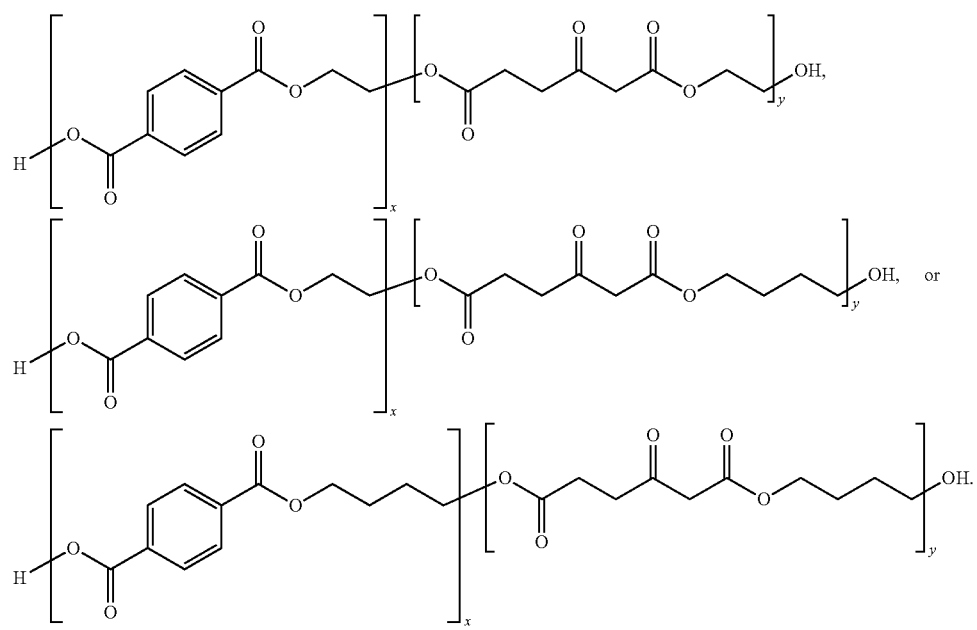

* * * * *